(12) United States Patent
Minamisawa

(10) Patent No.: US 11,668,950 B2
(45) Date of Patent: Jun. 6, 2023

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 330 days.

(21) Appl. No.: 17/271,583

(22) PCT Filed: Aug. 7, 2019

(86) PCT No.: PCT/JP2019/031240
§ 371 (c)(1),
(2) Date: Feb. 25, 2021

(87) PCT Pub. No.: WO2020/045013
PCT Pub. Date: Mar. 5, 2020

(65) Prior Publication Data
US 2022/0236582 A1    Jul. 28, 2022

(30) Foreign Application Priority Data

Aug. 31, 2018    (JP) .............................. JP2018-162950

(51) Int. Cl.
*G02B 27/64* (2006.01)
*G03B 5/00* (2021.01)
*H04N 23/57* (2023.01)

(52) U.S. Cl.
CPC ............. *G02B 27/646* (2013.01); *G03B 5/00* (2013.01); *H04N 23/57* (2023.01)

(58) Field of Classification Search
None
See application file for complete search history.

(56) References Cited

U.S. PATENT DOCUMENTS 8,711,236 B2    4/2014  Shimizu
10,110,816 B2    10/2018  Asakawa
(Continued)

FOREIGN PATENT DOCUMENTS

CN    203275847    11/2013
CN    108073011    5/2018
(Continued)

OTHER PUBLICATIONS

"Office Action of China Counterpart Application", dated Sep. 3, 2021, with English translation thereof, pp.1-16.
(Continued)

*Primary Examiner* — Derek S. Chapel
(74) *Attorney, Agent, or Firm* — JCIPRNET

(57) ABSTRACT

An optical unit is provided which enables performing shake correction of a moving element in the optical axis direction and the direction around the optical axis with a simple configuration and which takes into account ease of assembly. Specifically, this optical unit is provided with: a moving element (14) which is provided with an optical module; a static element (16); a rolling support mechanism (20) which supports the moving element with respect to the static element rotatably about the optical axis of the optical module; and a rolling drive mechanism (18) which rotates the moving element about the optical axis. The rolling support mechanism is provided with elastic members (36) which are arranged in multiple locations around the optical axis in positions between the moving element and the static element; the elastic members (36) are provided with one end part (36a), with an other end part (36b), and with a first elastic part (36c) and a second elastic part (36d) that are arranged between the one end part and the other end part. The first elastic part extends along the direction of the optical axis and generates an elastic force around the direc- (Continued)

tion of the optical axis; the second elastic part extends from the first elastic part in a direction that crosses the optical axis, and generates an elastic force in the direction of the optical axis.

15 Claims, 17 Drawing Sheets

(56) References Cited

U.S. PATENT DOCUMENTS

| | | | |
|---|---|---|---|
| 10,599,009 B2 | 3/2020 | Sue et al. | |
| 10,649,226 B2 | 5/2020 | Minamisawa et al. | |
| 11,579,464 B2 * | 2/2023 | Minamisawa | G03B 5/00 |
| 2021/0215900 A1 * | 7/2021 | Sue | G03B 5/00 |

FOREIGN PATENT DOCUMENTS

| | | |
|---|---|---|
| JP | 2011113009 | 6/2011 |
| JP | 2013083692 | 5/2013 |
| JP | 2017003956 | 1/2017 |
| JP | 2017215550 | 12/2017 |
| JP | 2018077393 | 5/2018 |
| JP | 2018077395 | 5/2018 |

OTHER PUBLICATIONS

"International Search Report (Form PCT/ISA/210)" of PCT/JP2019/031240, dated Nov. 12, 2019, with English translation thereof, pp. 1-4.

* cited by examiner

OPTICAL UNIT

CROSS-REFERENCE TO RELATED APPLICATION

This application is a 371 application of the international PCT application serial no. PCT/JP2019/031240, filed on Aug. 7, 2019, which claims the priority benefits of Japan application no. 2018-162950 filed on Aug. 31, 2018. The entirety of each of the above—mentioned patent applications is hereby incorporated by reference herein and made a part of this specification.

TECHNICAL FIELD

The present invention relates to an optical unit with a shake correction function.

BACKGROUND ART

An optical unit is, as an example, structured of a movable body having an optical module and a fixed body which displaceably holds the movable body. For example, in Patent Literature 1, a first holding body 2 is supported by a second holding body 3 by a plate spring 8 and a plate spring 9 so as to be movable in an optical axis direction, and the second holding body 3 is supported by a fixed body 4 so as to be movable in a direction substantially perpendicular to the optical axis direction by a plurality of wires 10.

CITATION LIST

Patent Literature

[Patent Literature 1]: Japanese Patent Laid-Open No. 2011-113009

SUMMARY OF THE INVENTION

Problems to be Solved by the Invention

In the optical unit, a wire fixing part 8*d* is formed in four corners of the plate spring 8 in an "X"-axis direction and a "Y"-axis direction, and one end of each wire 10 is fixed to the each wire fixing part 8*d* and the other end of the wire 10 is fixed to a base plate 18 which structures the fixed body 4. According to this structure, in a case that a force is applied to the optical unit in the optical axis direction, the wire fixing parts 8*d* of the plate spring 8 are resiliently bent to resist the force in the optical axis direction. On the other hand, in a case that a shake in a direction around the optical axis is applied to the optical unit, the wires 10 are capable of permitting rolling of the first holding body 2 and the second holding body 3 with respect to the fixed body 4.

However, in the structure, a plurality of members is required for correcting a shake in the optical axis direction and in the direction around the optical axis (rolling direction) and a plurality of the wires 10 is required to be attached between the wire fixing parts 8*d* and the base plate 18 with a predetermined tension and thus, assemblability of the optical unit is complicated.

In view of the problem described above, an objective of the present invention is to provide an optical unit which is capable of performing shake corrections of the movable body in the optical axis direction and in the direction around the optical axis in a simple structure and improving its assemblability.

Means to Solve the Problems

To solve the above-mentioned problem, the present invention provides an optical unit including a movable body having an optical module, a fixed body, a rolling support mechanism which turnably supports the movable body around an optical axis of the optical module with respect to the fixed body, and a rolling drive mechanism structured to turn the movable body around the optical axis. The rolling support mechanism includes elastic members which are disposed at a plurality of positions around the optical axis between the movable body and the fixed body, and the movable body is turnably supported around the optical axis by the elastic members. The elastic member is provided with one end part which is connected with the movable body, the other end part which is connected with the fixed body, and a first elastic part and a second elastic part which are disposed between the one end part and the other end part. The first elastic part is extended along the optical axis direction so as to generate an elastic force in a direction around the optical axis, and the second elastic part is extended from the first elastic part in a direction intersecting the optical axis so as to generate an elastic force in the optical axis direction.

According to this embodiment, the elastic member is disposed between the movable body and the fixed body, one end part of the elastic member is connected with the movable body and the other end part is connected with the fixed body, and the elastic member is provided between the one end part and the other end part with the first elastic part extended along the optical axis direction so as to generate an elastic force in a direction around the optical axis and the second elastic part extended from the first elastic part in a direction intersecting the optical axis so as to generate an elastic force in the optical axis direction. Therefore, elastic forces can be generated in the optical axis direction and the direction intersecting the optical axis by one elastic member. As a result, even when an impact is applied to the optical unit in the optical axis direction, the second elastic part generates an elastic force in the optical axis direction and thus, unintended plastic deformation of the first elastic part can be prevented.

Further, elastic forces can be generated in the optical axis direction and the direction around optical axis by one elastic member and thus, a structure of the optical unit for shake corrections in the optical axis direction and the direction around optical axis can be simplified. In addition, the optical unit can be assembled only by disposing a plurality of the elastic members between the movable body and the fixed body and thus, assemblability of the optical unit can be improved.

In the optical unit in accordance with the present invention, it is characterized in that the elastic member is structured as a plate spring, a length of the first elastic part in the optical axis direction is larger than a plate thickness in the optical axis direction of the second elastic part, and a length of the second elastic part in the direction intersecting the optical axis is larger than a plate thickness of the first elastic part in the direction intersecting the optical axis.

According to this embodiment, the elastic member is structured as a plate spring, a length of the first elastic part in the optical axis direction is larger than a plate thickness in the optical axis direction of the second elastic part, and a length of the second elastic part in the direction intersecting the optical axis is larger than a plate thickness of the first elastic part in the direction intersecting the optical axis. In other words, in a case that a force is applied to the optical unit in the optical axis direction, a plate thickness of the second elastic part in the optical axis direction is smaller than a length of the first elastic part in the optical axis direction and thus, the elastic member is easily deformed in the optical axis direction. As a result, when an impact such as dropping is applied to the optical unit in the optical axis direction, the second elastic part is resiliently bent in the optical axis direction to absorb at least a part of the impact and thus, the first elastic part can be prevented from being plastically deformed.

On the other hand, in a case that a force is applied in a direction intersecting the optical axis, a plate thickness of the first elastic part in the direction intersecting the optical axis is smaller than a length of the second elastic part in the direction intersecting the optical axis and thus, the first elastic part is resiliently bent to generate an elastic force in the first elastic part along the direction intersecting the optical axis. As a result, when the movable body is displaced with respect to the fixed body in a direction intersecting the optical axis of the optical unit, for example, in a direction around the optical axis, an elastic force generated in the first elastic part acts on the movable body to return to the original state and thus, a shake of the optical unit can be corrected. Therefore, elastic forces can be generated in the optical axis direction and the direction intersecting the optical axis by one elastic member and thus, plastic deformation of the first elastic part is prevented with a simple structure and shakes of the optical unit in the optical axis direction and the direction intersecting the optical axis can be corrected.

In the optical unit in accordance with the present invention, it is characterized in that the first elastic part of the elastic member is formed in a "U"-shape, one end of the first elastic part is connected with one of the one end part and the other end part, and the other end of the first elastic part is connected with the other of the one end part and the other end part through the second elastic part.

According to this embodiment, the first elastic part of the elastic member is formed in a "U"-shape, one end of the first elastic part is connected with one of the one end part and the other end part, and the other end of the first elastic part is connected with the other of the one end part and the other end part through the second elastic part. When the movable body is displaced in the direction around optical axis, the first elastic part in the "U"-shape is displaced so that a portion located on the movable body side and a portion located on the fixed body side are respectively displaced in reverse directions in the direction around optical axis. As a result, in the first elastic part in the "U"-shape, displacing amounts of the portion located on the movable body side and the portion located on the fixed body side become a half of a displacing amount of the movable body in the direction around optical axis and thus, a load applied to the first elastic part can be reduced. As a result, durability against a force applied to the optical unit in the optical axis direction, for example, against an impact force such as dropping can be enhanced. Therefore, buckling of the first elastic part of the elastic member can be suppressed.

In the optical unit in accordance with the present invention, it is characterized in that the first elastic part of the elastic member is formed in a "U"-shape, the second elastic part is disposed at each of both ends of the first elastic part, and the first elastic part is connected with the one end part and the other end part through the second elastic parts.

According to this embodiment, both ends of the first elastic part in the "U"-shape are respectively provided with the second elastic part and thus, durability against a force applied to the optical unit in the optical axis direction, for example, against an impact force such as dropping can be enhanced. As a result, buckling of the first elastic part of the elastic member can be surely suppressed.

In the optical unit in accordance with the present invention, it is characterized in that the one end part is extended to a first direction in the direction around the optical axis, and the other end part is extended to a second direction opposite to the first direction in the direction around the optical axis.

According to this embodiment, the one end part and the other end part are disposed in opposite directions to each other in the direction around optical axis. Therefore, for example, the one end part and the other end part can be disposed in the same distance as each other from the optical axis in a radial direction to the optical axis and thus, an occupation area of the elastic member in the optical unit can be reduced in the radial direction to the optical axis and the device size of the optical unit can be reduced.

In the optical unit in accordance with the present invention, it is characterized in that the second elastic part is formed in a taper shape whose plate width becomes wide as going from the first elastic part toward the one end part or the other end part.

According to this embodiment, the second elastic part is formed in a taper shape whose plate width becomes wide as going from the first elastic part toward the one end part or the other end part and thus, when the second elastic part is deformed in the optical axis direction, strength of a portion of the second elastic part adjacent to the one end part or the other end part can be increased and damage of the elastic member can be restrained.

In the optical unit in accordance with the present invention, it is characterized in that the second elastic part of the elastic member is formed in a "U"-shape, the first elastic part is provided with a first portion which is located between one end of the second elastic part and the one end part and a second portion which is located between the other end of the second elastic part and the other end part.

According to this embodiment, the second elastic part is formed in a "U"-shape and thus, durability against a force applied to the optical unit in the optical axis direction, for example, against an impact force such as dropping can be enhanced. As a result, buckling of the first elastic part of the elastic member can be surely suppressed.

In the optical unit in accordance with the present invention, it is characterized in that the first elastic part of the elastic member is formed in an "I"-shape, and the second elastic part is disposed at least one of a position between the one end part and the first elastic part and a position between the other end part and the first elastic part.

According to this embodiment, the first elastic part is formed in an "I"-shape and thus, in comparison with a case that the first elastic part is formed in a "U"-shape, an occupation area of the elastic member in the radial direction to the optical axis can be reduced and, as a result, the device size in the radial direction to the optical axis of the optical unit can be reduced.

In the optical unit in accordance with the present invention, it is characterized in that the rolling support mechanism includes at least one protruded part which is protruded from one of the movable body and the fixed body toward the other of the movable body and the fixed body, the protruded part is fixed with one of the one end part and the other end part of the elastic member, and the protruded part is structured to restrict a shake of the movable body by contacting with the other of the movable body and the fixed body.

According to this embodiment, the protruded part is fixed with one of the one end part and the other end part of the elastic member, and the protruded part is structured to restrict a shake of the movable body by contacting with the other of the movable body and the fixed body and thus, a shake of the movable body can be restricted in the vicinity of the elastic member. As a result, in comparison with a case that a restriction part for restricting a shake of the movable body is provided at a position separated from the elastic member, influence of dimensional tolerances and the like of respective members can be reduced and the shake can be restricted with a high degree of accuracy.

In the optical unit in accordance with the present invention, it is characterized in that the rolling support mechanism includes a receiving part which receives the protruded part in the other of the movable body and the fixed body, a space having a first length is formed between the protruded part and the receiving part in a first axial line direction intersecting the optical axis and passing the protruded part and the receiving part, the elastic member is disposed so that a plate thickness direction of the first elastic part is set in a direction intersecting the first axial line direction, the first elastic part is provided with a first portion and a second portion which are extended along the optical axis direction, the first portion and the second portion are disposed with a space having a second length therebetween in the first axial line direction, and the first length is shorter than the second length.

According to this embodiment, the first length which is a length of a space between the protruded part and the receiving part is set shorter than the second length which is a length in the first axial line direction between the first portion and the second portion of the first elastic part and thus, when the movable body is displaced in the first axial line direction due to an impact such as dropping, the protruded part is contacted with the receiving part. As a result, deformation in the first axial line direction of the first elastic part of the elastic member can be restricted to less than the first length. Therefore, the first portion and the second portion of the first elastic part do not deform beyond the elastic deformation region in the first axial line direction and thus, plastic deformation of the first elastic part can be prevented.

In the optical unit in accordance with the present invention, it is characterized in that the protruded part is provided in the movable body and a portion of the protruded part facing the receiving part in the first axial line direction is formed in a circular arc shape with the optical axis as a center.

According to this embodiment, the protruded part is provided in the movable body and a portion of the protruded part facing the receiving part in the first axial line direction is formed in a circular arc shape with the optical axis as a center. Therefore, when the movable body is displaced in the direction around optical axis with respect to the fixed body, the protruded part and the receiving part can be restrained from interfering with each other. As a result, a device size of the optical unit can be reduced in the radial direction to the optical axis.

In the optical unit in accordance with the present invention, it is characterized in that at least one of the protruded part and the receiving part is provided with a positioning part which positions at least one of the one end part and the other end part of the elastic member.

According to this embodiment, at least one of the protruded part and the receiving part is provided with a positioning part which positions at least one of the one end part and the other end part of the elastic member and thus, when the optical unit is to be assembled, the elastic member can be easily positioned. In addition, in a state that the elastic member is attached to at least one of the protruded part and the receiving part, in other words, in a state that a load is not generated in the other end part of the elastic member, the other end part can be assembled to the other of the protruded part and the receiving part. Therefore, the elastic member can be prevented from being fixed in a state that a load is applied, and assembling can be performed in a positional relationship between the movable body and the fixed body with a high degree of accuracy.

In the optical unit in accordance with the present invention, it is characterized in that the positioning part is a protruded part which is formed in at least one of the protruded part and the receiving part, and at least one of the one end part and the other end part of the elastic member is formed with a recessed part or a hole which is fitted with the protruded part.

According to this embodiment, the positioning part is a protruded part which is formed in at least one of the protruded part and the receiving part, and at least one of the one end part and the other end part of the elastic member is formed with a recessed part or a hole which is fitted with the protruded part. Therefore, only when the protruded part and the recessed part or the hole are fitted with each other, attachment of the elastic member is performed and thus, assemblability of the optical unit can be enhanced.

In the optical unit in accordance with the present invention, it is characterized in that at least one of the protruded part and the receiving part is provided with a turning restriction part which restricts turning of the elastic member.

According to this embodiment, at least one of the protruded part and the receiving part is provided with a turning restriction part which restricts turning of the elastic member and thus, when the optical unit is to be assembled, the elastic member can be attached to at least one of the protruded part and the receiving part in a state that its angle is determined. As a result, the elastic member can be fixed to the protruded part and the receiving part in a state that the position and angle of the elastic member are set with a high degree of accuracy.

In the optical unit in accordance with the present invention, it is characterized in that the optical module includes a shake correction mechanism in a pitching direction and a yawing direction.

According to this embodiment, operations and effects similar to the operations and effects in the above-mentioned embodiments can be obtained.

Effects of the Invention

According to the present invention, the elastic member is disposed between the movable body and the fixed body, one end part of the elastic member is connected with the movable body and the other end part is connected with the fixed body, and the elastic member is provided between the one end part and the other end part with the first elastic part extended along the optical axis direction so as to generate an elastic force in a direction around the optical axis and the second elastic part extended from the first elastic part in a direction intersecting the optical axis so as to generate an elastic force in the optical axis direction. Therefore, elastic forces can be generated in the optical axis direction and the direction intersecting the optical axis by one elastic member. As a result, even when an impact is applied to the optical unit in the optical axis direction, the second elastic part generates an elastic force in the optical axis direction and thus, unintended plastic deformation of the first elastic part can be prevented. Further, elastic forces can be generated in the optical axis direction and the direction around optical axis by one elastic member and thus, a structure of the optical unit for a shake correction in the optical axis direction and the direction around optical axis can be simplified. In addition, the optical unit can be assembled only by disposing a plurality of the elastic members between the movable body and the fixed body and thus, assemblability of the optical unit can be improved.

DESCRIPTION OF EMBODIMENTS

Figure 1:
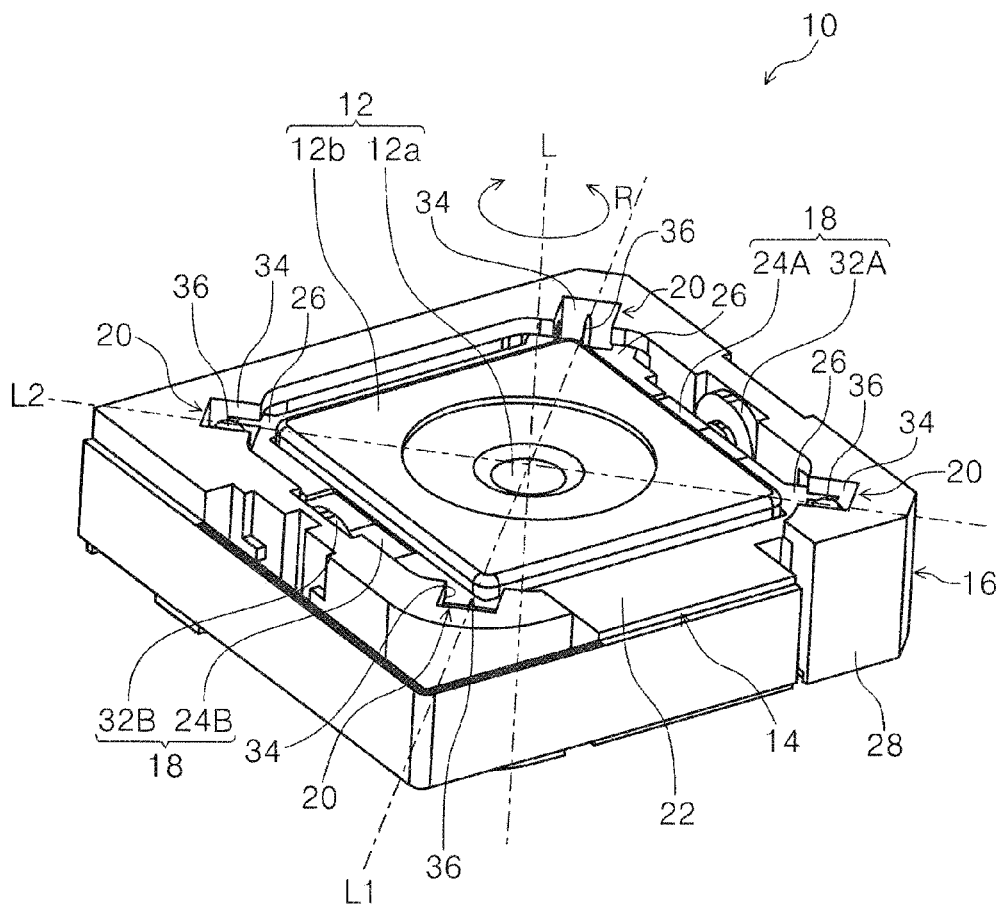
FIG. 1 is a perspective view showing an optical unit in accordance with the present invention.

Embodiments of the present invention will be described below with reference to the accompanying drawings. The same structures in the respective embodiments are indicated with the same reference signs, and the respective structures are described only in the first embodiment and their descriptions will be omitted in the following embodiments.

In each of FIG. 1 through FIG. 16A and FIG. 16B, an alternate long and short dash line with the reference sign "L" indicates an optical axis, an alternate long and short dash line with the reference sign "L1" indicates a first axial line intersecting the optical axis, and an alternate long and short dash line with the reference sign "L2" indicates a second axial line "L2" intersecting the optical axis "L" and the first axial line "L1". In the respective drawings, the "Z"-axis direction is the optical axis direction, the "R"-direction is a direction around the optical axis, the "X"-axis direction is a direction intersecting the optical axis, in other words, a yawing direction, and the "Y"-axis direction is a direction intersecting the optical axis, in other words, a pitching direction. A first axial line direction is a direction along the first axial line "L1", and a second axial line direction is a direction along the second axial line "L2".

First Embodiment

<<<Schematic Entire Structure of Optical Unit>>>

A structure of an optical unit 10 in accordance with a first embodiment will be described below with reference to FIG. 1 and FIG. 2. The optical unit 10 includes a movable body 14 having an optical module 12, a fixed body 16 which holds the movable body 14 in a displaceable state in a direction "R" around the optical axis, a rolling drive mechanism 18 structured to drive the movable body 14 in the direction "R" around the optical axis, and a rolling support mechanism 20 which turnably supports the movable body 14 with respect to the fixed body 16 in the direction "R" around the optical axis.

<<<Regarding Optical Module>>>

In this embodiment, the optical module 12 is formed in a substantially rectangular case shape and is, for example, used as a thin camera which is mounted on a cellular phone with a camera and a tablet type PC, or the like. The optical module 12 includes a lens 12a on an object side "+Z", and an optical device for imaging and the like are incorporated in an inside of the rectangular case-shaped housing 12b. The optical module 12 in this embodiment is, as an example, incorporated with an actuator structured to correct shakes in the pitching direction "Y" and the yawing direction "X" occurred in the optical module 12 and is structured so that shake corrections in the pitching direction "Y" and the yawing direction "X" can be performed.

In this embodiment, the optical module 12 is structured so as to be capable of performing shake corrections in the pitching direction "Y" and the yawing direction "X". However, the present invention is not limited to this structure and, for example, the optical module 12 may be structured so as to be capable of performing one of shake corrections in the pitching direction "Y" and the yawing direction "X" and, alternatively, the optical module 12 may be structured to provide with an autofocus function without performing corrections in the pitching direction "Y" and the yawing direction "X".

<<<Regarding Movable Body>>>

Figure 2:
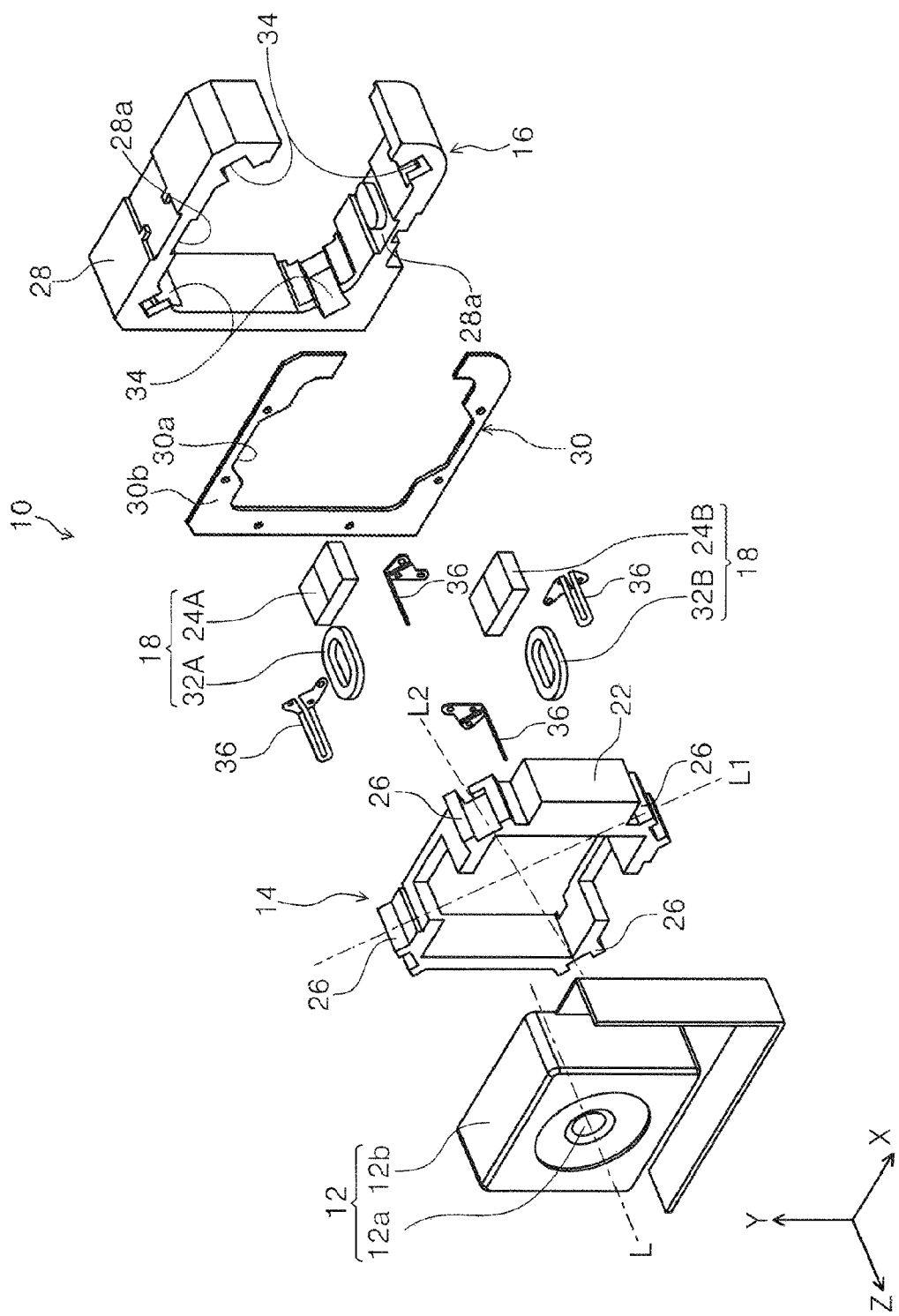
FIG. 2 is an exploded perspective view showing an optical unit in accordance with the FIG. 3 is a perspective view showing a relationship between a movable body and a fixed body in an optical unit in accordance with the present invention.

In FIG. 1 and FIG. 2, the movable body 14 includes the optical module 12, a holder frame 22 and magnets 24A and 24B. The holder frame 22 is structured as a rectangular frame-shaped member (FIG. 2 through FIG. 4) which is provided so as to surround remaining four faces except a front face where the lens 12a of the optical module 12 is provided and a rear face on the opposite side. The holder frame 22 in this embodiment is, as an example, structured so that the optical module 12 is detachable.

The magnets 24A and 24B for rolling correction are attached to outer faces of the holder frame 22 by utilizing two faces of the holder frame 38 which are faced each other. The holder frame 22 is formed with a plurality of protruded parts 26 which are protruded in the first axial line direction and the second axial line direction from the holder frame 22 toward an outer peripheral part, in other words, toward the fixed body 16 side. In this embodiment, a plurality of the protruded parts 26 is respectively formed at positions facing each other with the optical axis "L" interposed therebetween and, as an example, a pair of the protruded parts 26 is respectively formed in the first axial line direction and the second axial line direction. A structure of the protruded part 26 will be described below.

<<<Regarding Fixed Body>>>

Figure 3:
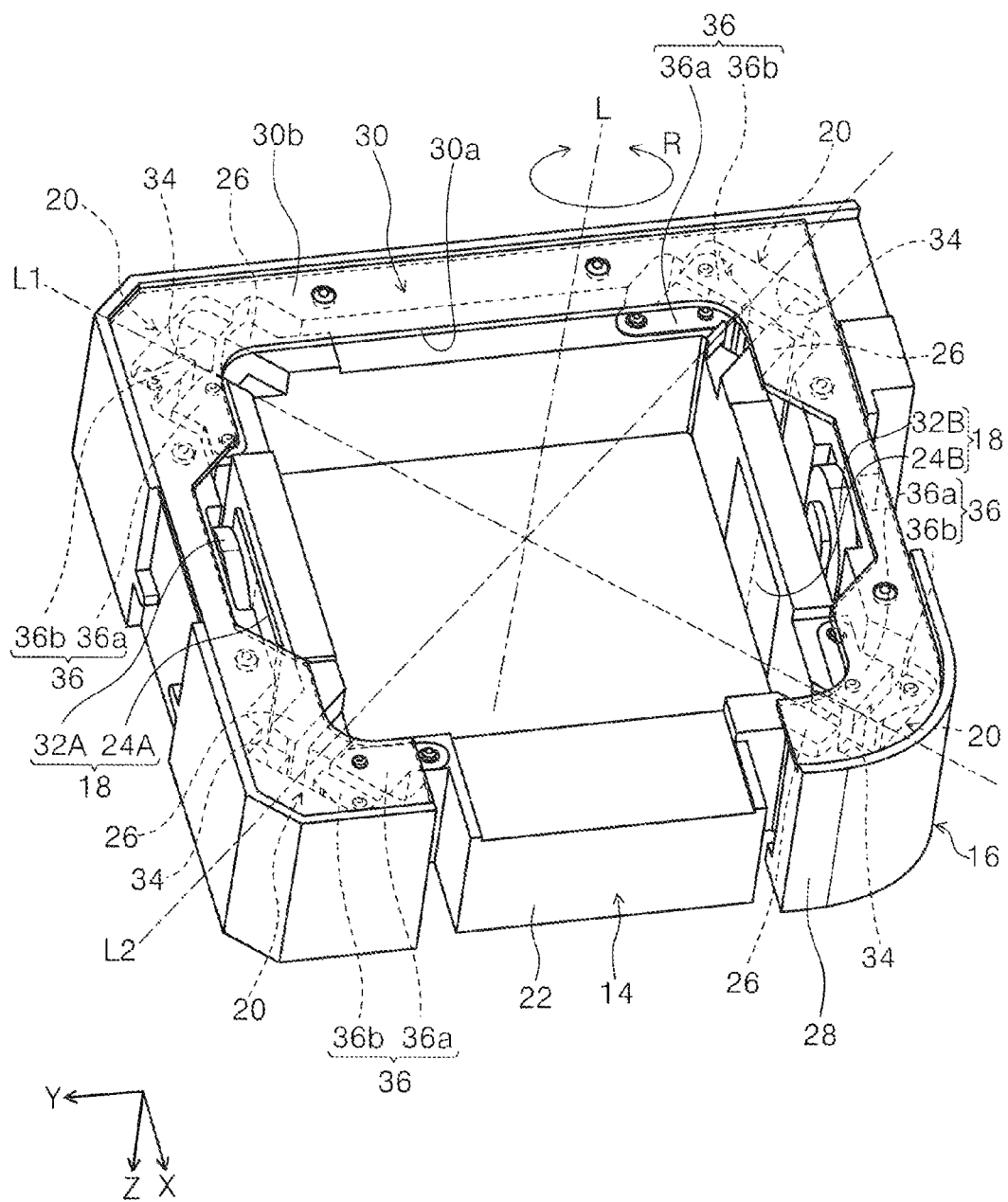

In FIG. 1 through FIG. 3, the fixed body 16 includes a fixed frame 28, a bottom plate 30 and coils 32A and 32B. In this embodiment, the fixed frame 28 is structured as a rectangular frame-shaped member which is provided so as to surround at least three faces of the holder frame 22 of the movable body 14 in the direction "R" around the optical axis. In this embodiment, the fixed frame 28 is formed in a shape that a part of the fixed frame 28 in the "+X" axis direction with respect to the holder frame 22 is cut out.

Four corners of the rectangular frame-shaped fixed frame 28 are respectively formed along the first axial line or along the second axial line with receiving parts 34 in a recessed shape, which receive the protruded parts 26 of the holder frame 22. The receiving part 34 will be described below. In addition, inner faces of the fixed frame 28 are respectively provided with coil attaching parts 28a (FIG. 2) at positions facing the magnets 24A and 24B when the holder frame 22 is inserted into the fixed frame 28.

As shown in FIG. 1 and FIG. 3, the coils 32A and 32B are respectively attached to the coil attaching parts 28a. In this embodiment, each of the coil 32A and the coil 32B is, as an example, structured as a winding coil, but may be structured of a pattern substrate (coil substrate) in which a coil is incorporated into wiring in a substrate as a pattern.

In this embodiment, in FIG. 1 and FIG. 3, in a state that the movable body 14 is disposed in an inside of the fixed body 16, the magnet 24A and the coil 32A face each other, and the magnet 24B and the coil 32B face each other. In this embodiment, a pair of the magnet 24A and the coil 32A and a pair of the magnet 24B and the coil 32B structure a rolling drive mechanism 18. Rolling correction of the movable body 14 is performed by the rolling drive mechanism 18.

When a shake occurs in the direction "R" around the optical axis in the optical unit 10, the shake in the direction "R" around the optical axis of the optical unit 10 is detected by a pair of a magnetic sensor (Hall element) not shown and either of the magnets 24A and 24B for rolling detection and correction through a variation of the magnetic flux density. The rolling drive mechanism 18 is operated so as to correct the shake based on a detected result of the shake. In other words, an electric current is supplied to the coils 32A and 32B so as to move the movable body 14 in a direction canceling the shake of the optical unit 10 and the rolling drive mechanism 18 is driven and thereby, the shake in the direction "R" around the optical axis is corrected.

A drive source for performing a correcting operation of a shake is not limited to a voice coil motor which is structured of respective pairs of the coils 32A and 32B and the magnets 24A and 24B like the rolling drive mechanism 18. As other drive sources, a stepping motor, a piezo element or the like may be utilized.

In this embodiment, the bottom plate 30 is attached to an end part on the "−Z" direction side of the fixed frame 28 in FIG. 3. The bottom plate 30 is structured as a flat plate member in a rectangular shape. In this embodiment, the bottom plate 30 is formed with an opening part 30a in a center part, and an outer end part 30b is formed around the opening part 30a. In this embodiment, in a state that the movable body 14 is held by the fixed body 16 (FIG. 3), the outer end part 30b is disposed on the "−Z" direction side with respect to the rolling support mechanism 20 so that a part of the outer end part 30b covers the rolling support mechanism 20 in the "Z"-axis direction. In this embodiment, the outer end part 30b of the bottom plate 30 functions as a third restriction part 52 which restricts displacement of the movable body 14 to the "−Z" axial direction. The third restriction part 52 will be described below.

<<<Regarding Rolling Support Mechanism>>>

In FIG. 1 through FIG. 3, the rolling support mechanism 20 is structured of the protruded part 26, the receiving part 34 and an elastic member 36. In FIG. 3 through FIG. 6, the elastic member 36 is, as an example, structured as a plate spring which is formed in a "U"-shape. In this embodiment, the elastic member 36 is provided with one end part 36a, the other end part 36b, a first elastic part 36c and a second elastic part 36d.

Figure 17:
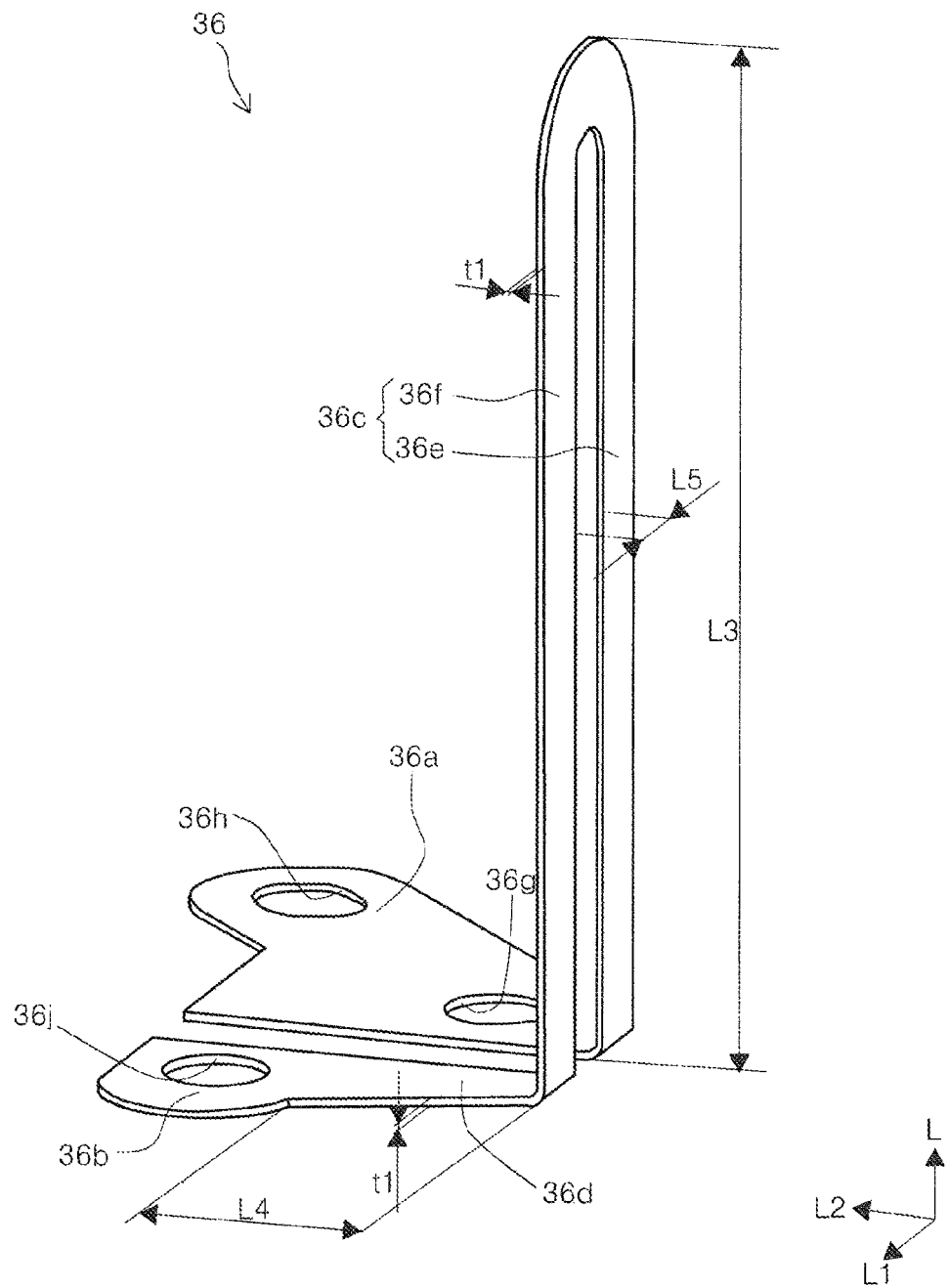
FIG. 17 is a perspective view showing an elastic member in accordance with a first embodiment.

In this embodiment, as shown in FIG. 17, the elastic member 36 is formed as a plate spring which is structured by appropriately bending a plate member having a plate thickness "t1". In this embodiment, the first elastic part 36c is, as shown in FIG. 17, provided with a first portion 36e extended along the optical axis direction and a second portion 36f extended in parallel with the first portion 36e along the optical axis direction.

Figure 7:
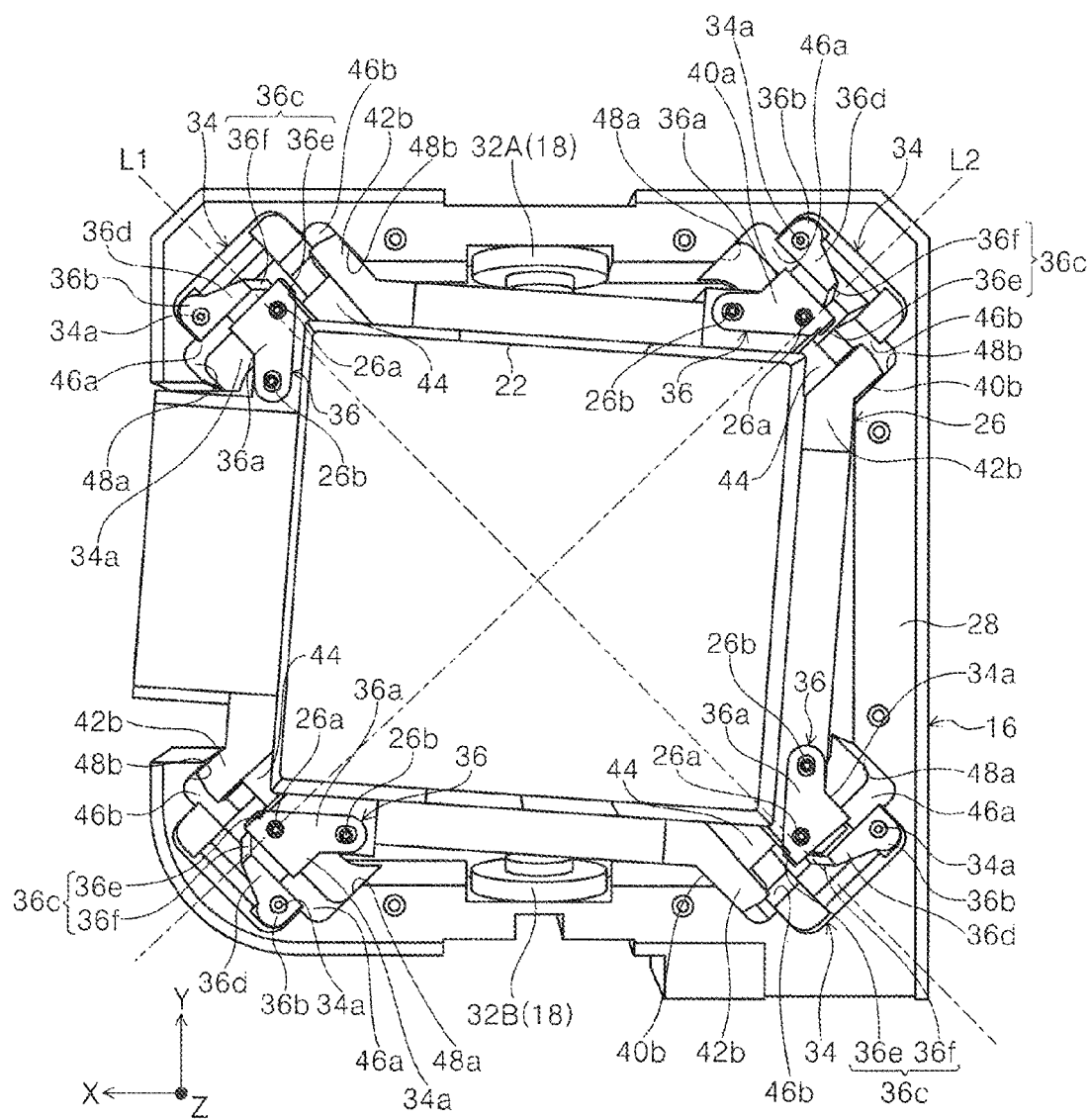
FIG. 7 is a plan view showing a state that a movable body is swung around an optical axis with respect to a fixed body.
Figure 8:
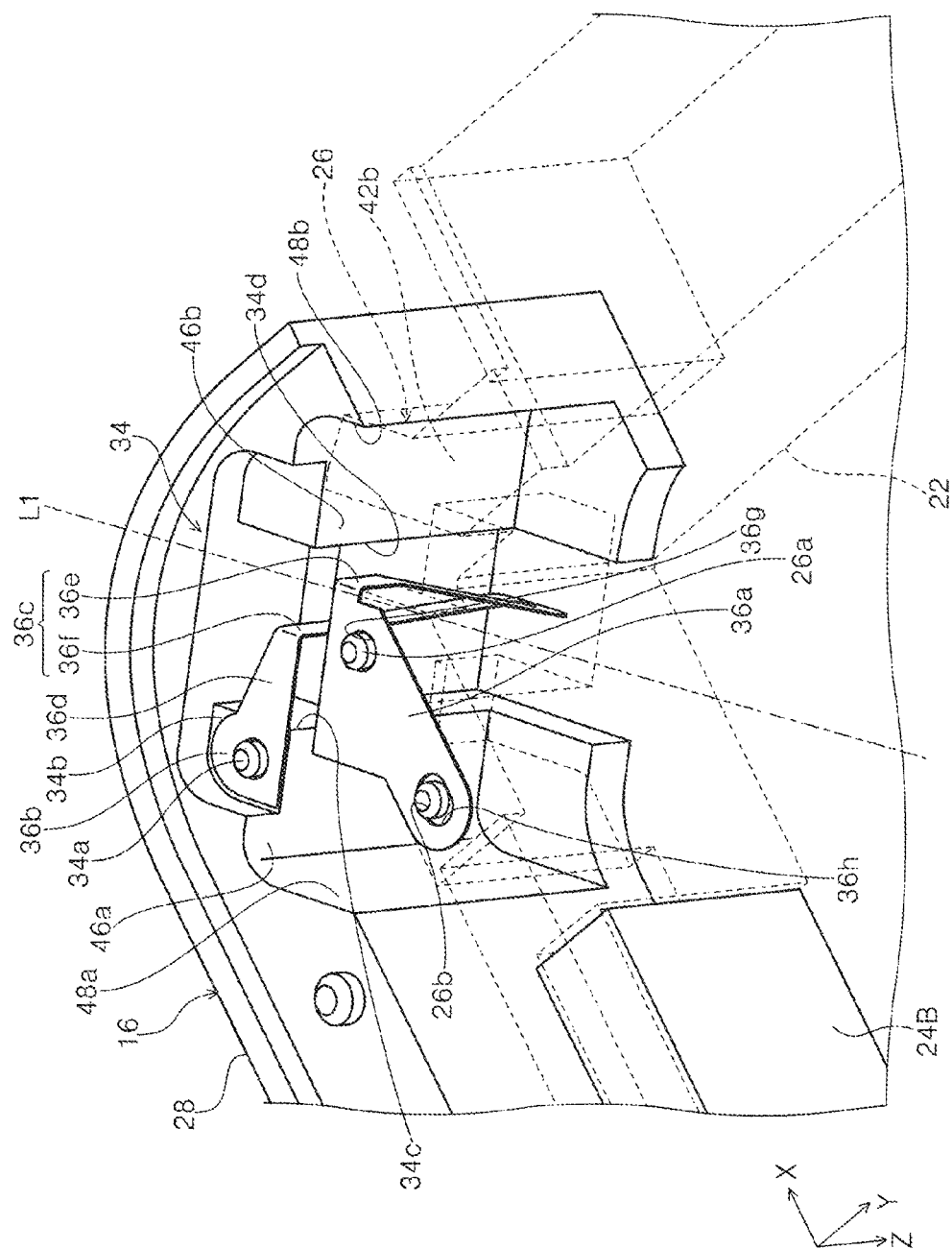
FIG. 8 is a perspective view showing a state of an elastic member in a state that a movable body is swung around an optical axis with respect to a fixed body.

The first portion 36e is extended from the one end part 36a to an upper side and then curved, and the second portion 36f is extended to a lower side. A lower end of the second portion 36f is connected with the second elastic part 36d. A side of the second elastic part 36d which is opposite to a side connected with the second portion 36f is connected with the other end part 36b. In this embodiment, when the movable body 14 is turned with respect to the fixed body 16 as shown in FIG. 7 and FIG. 8, the first portion 36e and the second portion 36f are elastically deformed in reverse directions to each other in the direction "R" around the optical axis. Therefore, in the direction "R" around the optical axis, deforming amounts of the first portion 36e and the second portion 36f of the first elastic part 36c can be set half a deforming amount of the movable body 14 and thus, a load applied to the elastic member 36 can be reduced. As a result, durability against a force applied to the optical unit 10 in the optical axis direction, for example, an impact force such as dropping can be enhanced. In this manner, buckling of the first elastic part 36c of the elastic member 36 can be suppressed.

In this embodiment, the second elastic part 36d is provided with a shape so that its plate width, i.e., a width in the first axial line direction becomes wider from a side connected with the second portion 36f of the first elastic part 36c toward the other end part 36b in the second axial line direction. As a result, strength of a connected portion of the second elastic part 36d with the other end part 36b can be increased. The posture of the elastic member 36 in FIG. 17 shows, as an example, a state that the first elastic part 36c is disposed along the optical axis "L" and that the first portion 36e and the second portion 36f are separated from each other with a space therebetween in the first axial line direction.

In this embodiment, the first elastic part 36c is formed with a length "L3" in the optical axis direction, and the second elastic part 36d is, as an example, formed with a length "L4" in the second axial line direction. The first portion 36e and the second portion 36f are disposed with a distance of a length "L5" as a second length therebetween in the first axial line direction.

In this embodiment, as shown in FIG. 17, in the second axial line direction, a plate thickness of the first elastic part 36c is "t1" and a length in the second axial line direction of the second elastic part 36d is "L4". The length "L4" is set larger than the plate thickness "t1". Therefore, in a case that a force is applied in the second axial line direction to the elastic member 36, the first elastic part 36c is elastically deformed in the second axial line direction. As a result, a shake in the direction "R" around the optical axis can be corrected by an elastic force generated in the first elastic part 36c.

On the other hand, in the optical axis direction, a length in the optical axis direction of the first elastic part 36c is "L3" and a plate thickness of the second elastic part 36d is "t1". The length "L3" is set larger than the plate thickness "t1". Therefore, in a case that a force is applied in the optical axis direction to the elastic member 36, the second elastic part 36d is elastically deformed in the optical axis direction. As a result, a shake in the optical axis direction can be corrected by an elastic force generated in the second elastic part 36d.

In other words, in the elastic member 36 in this embodiment, the first elastic part 36c is capable of generating an elastic force in the direction "R" around the optical axis, and the second elastic part 36d is capable of generating an elastic force in the optical axis direction. Therefore, an elastic force can be generated in the optical axis direction and the direction "R" around the optical axis by one elastic member 36. As a result, even when an impact is applied to the optical unit 10 in the optical axis direction, the second elastic part 36d generates an elastic force in the optical axis direction and thus, unintended plastic deformation of the first elastic part 36c can be prevented. In addition, a structure of the optical unit 10 for a shake correction in the optical axis direction and the direction "R" around the optical axis can be simplified.

In this embodiment, one end part 36a of the elastic member 36 is formed with a first positioned part 36g and a turning restricted part 36h as a "recessed part or hole". In this embodiment, the first positioned part 36g is structured as a through-hole which penetrates through the one end part 36a. The turning restricted part 36h is structured as a long hole which penetrates through the one end part 36a.

The other end part 36b is formed with a second positioned part 36j as a "recessed part or hole". In this embodiment, the second positioned part 36j is structured as a through-hole which penetrates through the other end part 36b.

Figure 5:
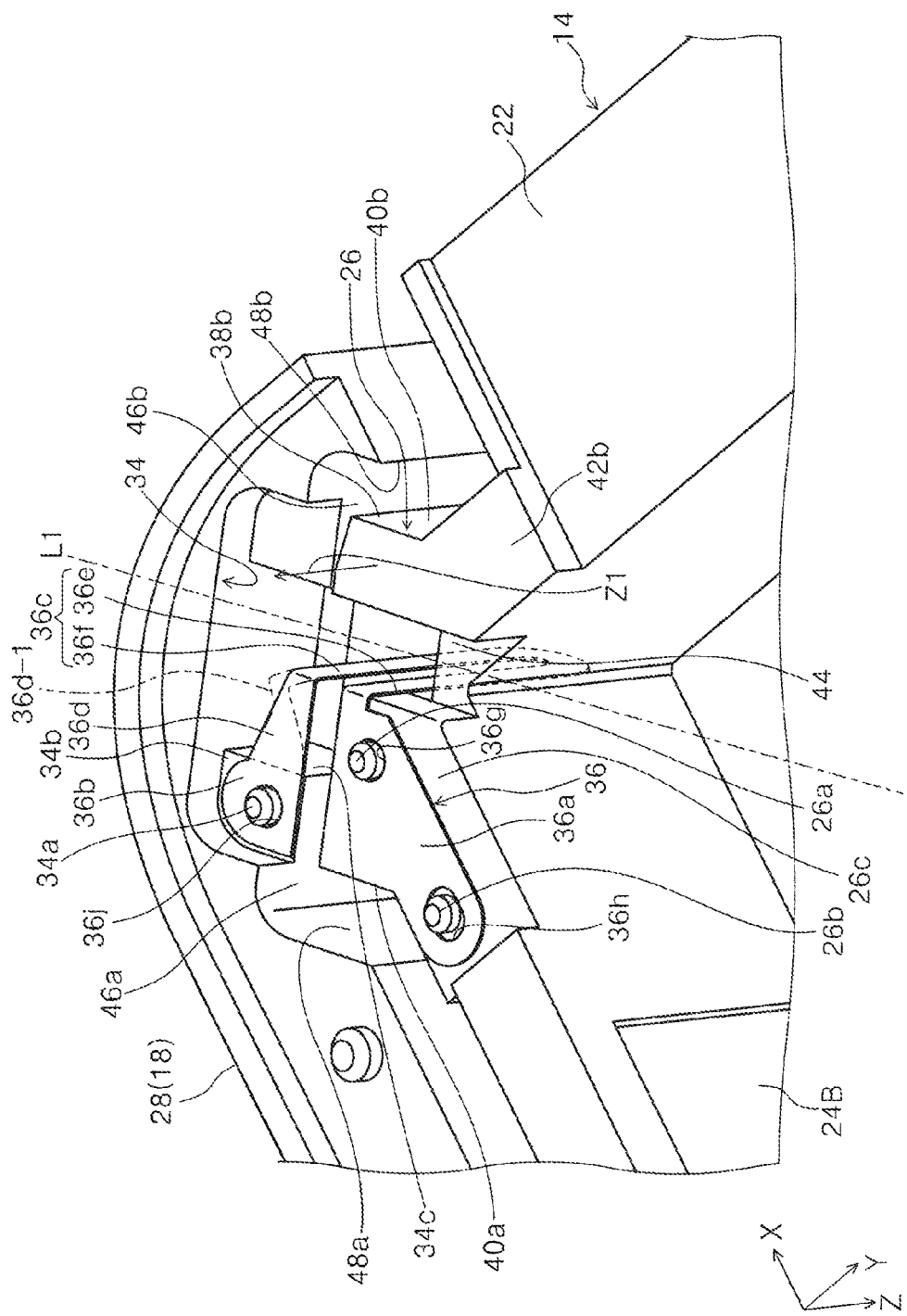
FIG. 5 is a perspective view showing a relationship between a movable body, a fixed body and an elastic member.

As shown in FIG. 5, in this embodiment, the one end part 36a is fixed to the protruded part 26 of the holder frame 22, and the other end part 36b is fixed to the receiving part 34 of the fixed frame 28. Specifically, the protruded part 26 is provided with a first positioning part 26a as a pin-shaped protruded part which is protruded from the protruded part 26 to the "−Z" direction, and a turning restriction part 26b in a pin shape which is protruded to the "−Z" direction from the protruded part 26. On the other hand, the receiving part 34 is formed with a second positioning part 34a as a pin-shaped protruded part which is protruded to the "−Z" direction from the receiving part 34.

In this embodiment, the first positioning part 26a of the protruded part 26 is inserted into the first positioned part 36g of the elastic member 36, and the turning restriction part 26b is inserted into the turning restricted part 36h. On the other hand, the second positioning part 34a is inserted into the second positioned part 36j.

In this embodiment, when the optical unit 10 is to be assembled, first, the first positioning part 26a of the protruded part 26 is inserted into the first positioned part 36g of the elastic member 36 and the first positioning part 26a is welded. As a result, positioning of the elastic member 36 with respect to the holder frame 22 is performed. Subsequently, the turning restriction part 26b is inserted into the turning restricted part 36h in a long hole shape and the turning restriction part 26b is welded. As a result, turning restriction of the elastic member 36 with respect to the holder frame 22 is performed. In this manner, an attaching operation of the elastic member 36 to the holder frame 22 is completed.

Next, the holder frame 22 is inserted into the fixed frame 28 from the "−Z" direction side. After that, the second positioning part 34a of the receiving part 34 is inserted into the second positioned part 36j of the elastic member 36 and the second positioning part 34a is welded and thereby, the movable body 14 is held by the fixed body 16.

Therefore, the elastic member 36 is attached to the first positioning part 26a, which is a positioning pin, and the turning restriction part 26b, and the first positioning part 26a and the turning restriction part 26b are welded. In this state, a load is not applied to the second positioned part 36j of the elastic member 36. After that, the second positioned part 36j of the elastic member 36 is attached to the second positioning part 34a, which is a positioning pin, and the second positioning part 34a is welded. In other words, the movable body 14 can be assembled to the fixed body 16 in a state that a load is not applied to the elastic member 36 and thus, positioning and turning restriction of the elastic member 36 can be easily performed with respect to the movable body 14 and the fixed body 16, and the movable body 14 and the fixed body 16 can be assembled in a positional relationship with a high degree of accuracy. In addition, assembling work of the movable body 14 to the fixed body 16 is finished in these operations and thus, assembling work of the optical unit 10 can be simplified and assemblability is enhanced.

Figure 4:
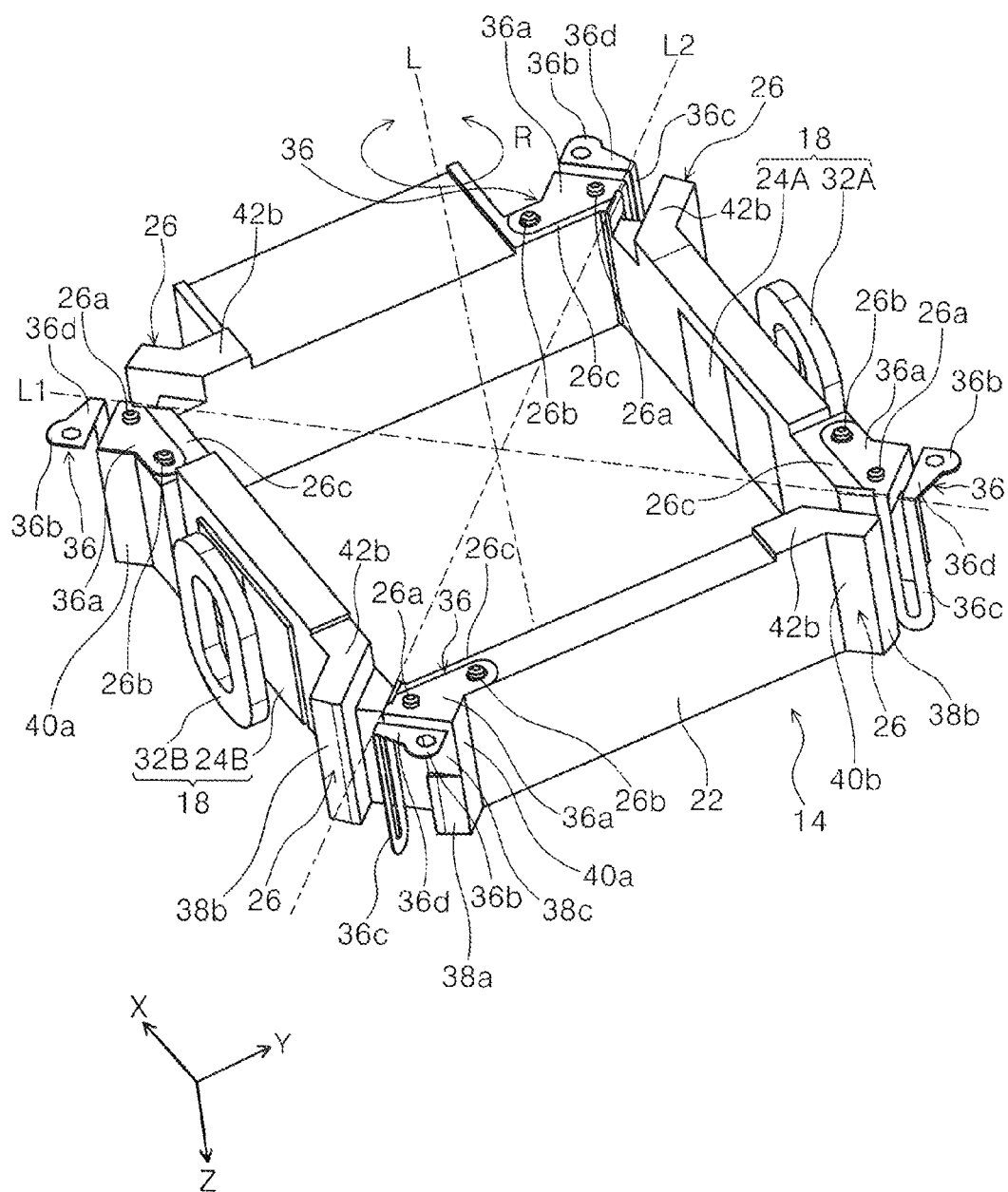
FIG. 4 is a perspective view showing a movable body, a rolling drive mechanism and a rolling support mechanism.

In this embodiment, as shown in FIG. 4 and FIG. 5, the one end part 36a of the elastic member 36 is fixed to the first elastic member fixing part 26c provided in the protruded part 26 by the first positioning part 26a and the turning restriction part 26b. More specifically, the first elastic member fixing part 26c is located on the "+Z" direction side of the one end part 36a and supports the one end part 36a.

The other end part 36b of the elastic member 36 is fixed to the second elastic member fixing part 34b provided in the receiving part 34 by the second positioning part 34a. More specifically, the second elastic member fixing part 34b is located on the "+Z" direction side of the other end part 36b and supports the other end part 36b. As shown in FIG. 5, in this embodiment, a member for preventing displacement in the "Z"-axis direction of the second elastic part 36d is not disposed on the "+Z" direction side and the "−Z" direction side of the second elastic part 36d of the elastic member 36. As a result, when an impact is applied, for example, in a direction of the arrow indicated with the reference sign "Z1", the second elastic part 36d is elastically deformed to the "−Z" direction due to displacement to the "−Z" axial direction side of the movable body 14 with respect to the fixed body 16. In FIG. 5, the two-dot chain line with the reference sign 36*d*-1 schematically shows the second elastic part 36*d* which is elastically deformed to the "−Z" direction.

When the second elastic part 36*d* is elastically deformed, the elastic member 36 generates an elastic force in the optical axis direction. The movable body 14 can be returned to the original position in the optical axis direction by the elastic force from a position displaced in the optical axis direction with respect to the fixed body 16.

Figure 6:
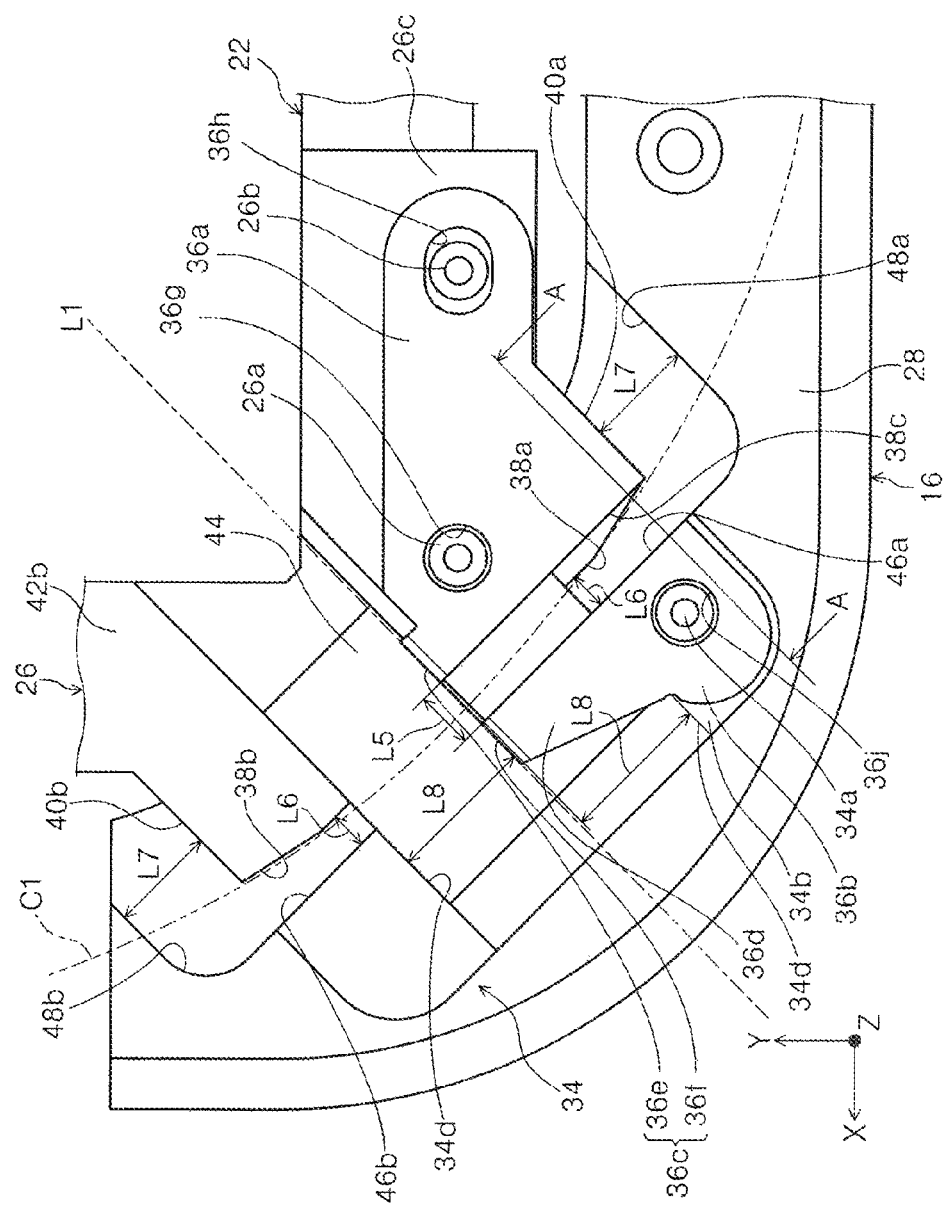
FIG. 6 is a plan view showing a relationship between a protruded part of a movable body and a receiving part of a fixed body.

Further, as shown in FIG. 4 through FIG. 6, the elastic member 36 is disposed between the movable body 14 and the fixed body 16 so that a plate thickness direction of the first elastic part 36*c* is directed in the direction "R" around the optical axis. Therefore, the elastic member 36 can be smoothly deformed in the direction "R" around the optical axis in a state that the movable body 14 is surely supported so as not to be carelessly displaced in the optical axis direction and in a direction intersecting the optical axis which are different from the direction "R" around the optical axis that is a turning direction.

<<<Regarding Relationship Between Protruded Part and Receiving Part>>>

A relationship between the protruded part 26 and the receiving part 34 will be described below with reference to FIG. 4 through FIG. 9.

First, the protruded part 26 will be described below. In this embodiment, the protruded parts 26 are protruded from four corners of the holder frame 22 along the first axial line direction or the second axial line direction. More specifically, the protruded part 26 in this embodiment is provided with a first restricted part 38, second restricted parts 40*a* and 40*b*, and third restricted parts 42*a* and 42*b*. In the following descriptions, as an example, a structure of the protruded part 26 protruded along the first axial line direction and the receiving part 34 which receives the protruded part 26 are described. However, in a case of the protruded part 26 protruded along the second axial line direction and the receiving part 34 which receives the protruded part 26, a relationship in the first axial line direction between the protruded part 26 and the receiving part 34 is interchanged with the second axial line direction.

In this embodiment, the first restricted part 38 is, as an example, formed on a tip end side of the protruded part 26 in the first axial line direction (FIG. 4 and FIG. 6). In this embodiment, the first restricted part 38 is, as shown in FIG. 6, formed as a curved surface in a circular arc shape as a whole. Specifically, the first restricted part 38 is, as an example, structured as a curved surface along a periphery of the imaginary circle "C1" with the optical axis "L" as a center.

In this embodiment, a center portion in the second axial line direction of the first restricted part 38 is formed with a groove part 44. The first elastic part 36*c* of the elastic member 36 is disposed in the groove part 44. Further, the center portion in the second axial line direction of the first restricted part 38 is cut out for the groove part 44 and the first restricted part 38 is divided into two portions in the second axial line direction to form the first restricted parts 38*a* and 38*b*.

In the protruded part 26, an end part on the "−Z" axial direction side of the first restricted part 38*a* on a side where the first elastic member fixing part 26*c* is provided is formed with a relief part 38*c* (FIG. 4) which is formed by cutting out a part of the first restricted part 38*a*. The relief part 38*c* is provided so that, when the movable body 14 is displaced to the "−Z" axial direction with respect to the fixed body 16, the first restricted part 38*a* avoids interfering with the other end part 36*b* and the second elastic part 36*d* of the elastic member 36.

In this embodiment, the first restricted part 38 is formed as a curved surface in a circular arc shape along a periphery of the imaginary circle "C1". However, the present invention is not limited to this structure. For example, the first restricted part 38 may be formed in a taper shape which is extended from the groove part 44 to an outer side in the second axial line along a tangent line (not shown) contacted with the periphery of the imaginary circle "C1" and is inclined to a side of the optical axis "L", in other words, to a side of the center direction as going to the outer side in the second axial line direction.

Figure 9:
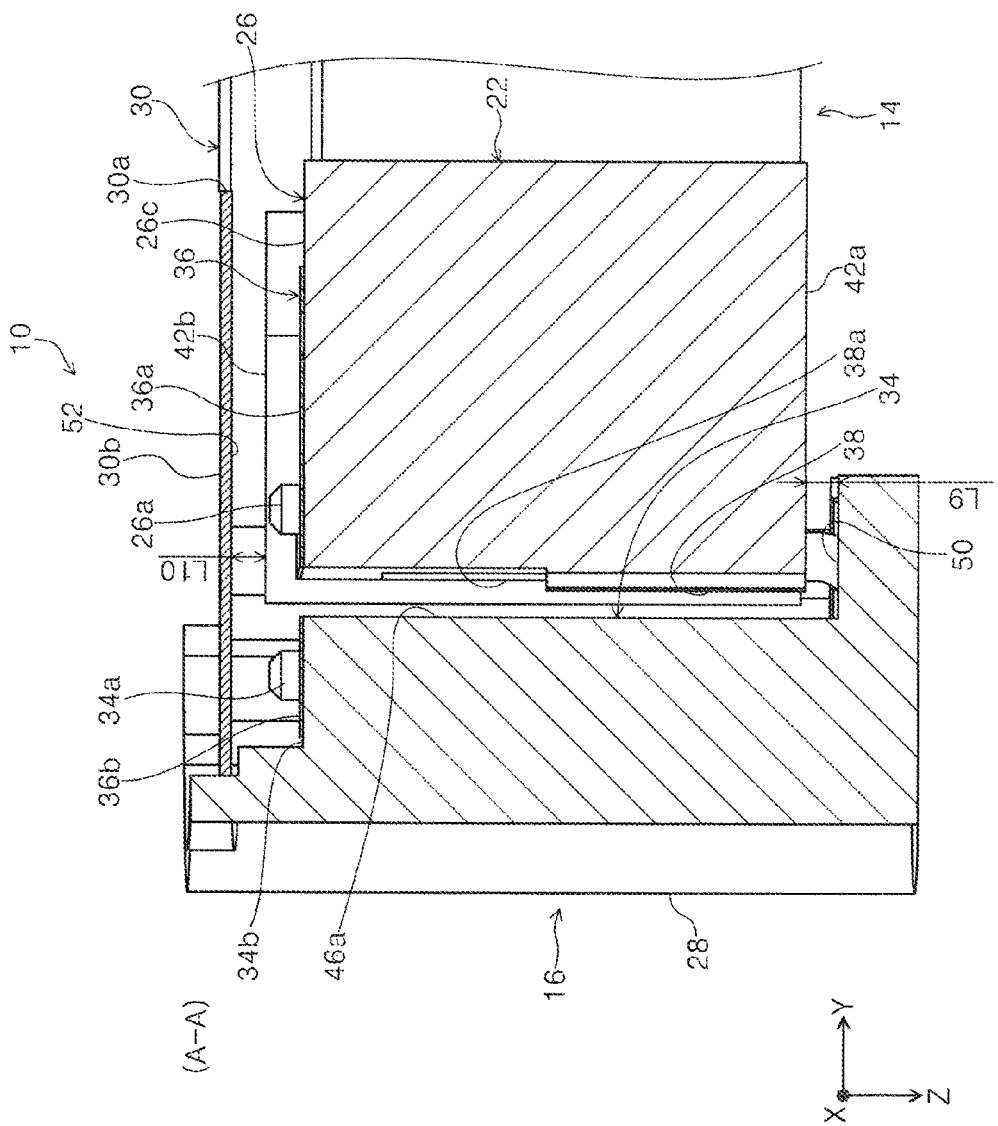
FIG. 9 is a cross-sectional side view showing a relationship between a protruded part and a receiving part.

In this embodiment, side faces of end parts on both sides in the second axial line direction of the protruded part 26 are structured as second restricted parts 40*a* and 40*b* (FIG. 4 through FIG. 6). In addition, an end part on the "+Z" direction side and an end part on the "−Z" direction side of the protruded part 26 are formed with third restricted parts 42*a* and 42*b* (FIG. 5, FIG. 6 and FIG. 9).

<<<Regarding Receiving Part>>>

Next, the receiving part 34 will be described below with reference to FIG. 5 through FIG. 9. In this embodiment, the receiving part 34 is structured as a recessed part, which is recessed along the first axial line direction or the second axial line direction at four corners of the fixed frame 28, and is structured so as to receive the protruded part 26 on an inner side. More specifically, the receiving part 34 in this embodiment is provided with first restriction parts 46*a* and 46*b*, second restriction parts 48*a* and 48*b*, and a third restriction part 50.

As shown in FIG. 6, in a state that the protruded part 26 is received in the receiving part 34, the first restriction parts 46*a* and 46*b* are formed so as to face the first restricted parts 38*a* and 38*b* in the first axial line direction. The first restriction part 46*a* is formed as a face which faces the first restricted part 38*a*, and the first restriction part 46*b* is formed as a face which faces the first restricted part 38*b*.

In this embodiment, in the first axial line direction, distances between the first restriction parts 46*a* and 46*b* and the first restricted parts 38*a* and 38*b* are set to be a first length "L6". In this embodiment, the first length "L6" is a distance in a portion where a distance in the first axial line direction between the first restriction part 46*a* and the first restricted part 38*a* is the narrowest.

In this embodiment, the first restricted parts 38*a* and 38*b* are formed in a circular arc shape along the imaginary circle "C1" with the optical axis "L" as a center and thus, it is structured so that a distance between the first restriction part 46*a* and the first restricted part 38*a* and a distance between the first restriction part 46*b* and the first restricted part 38*b* are widened as going to an outer side in the second axial line direction. In other words, the first restricted part 38 is provided with a shape in which facing distances in the first axial line direction with respect to the first restriction parts 46*a* and 46*b* are widened as going to an outer side in the second axial line direction.

Therefore, as shown in FIG. 7, when the movable body 14 is turned in the direction "R" around the optical axis with respect to the fixed body 16, interferences of the first restricted parts 38*a* and 38*b* with the first restriction parts 46*a* and 46*b* can be restrained.

In this embodiment, for example, when an impact is applied to the movable body 14 in FIG. 6, in other words, to the holder frame 22 in the first axial line direction, the protruded part 26 is displaced toward a side of the first restriction parts 46a and 46b in the receiving part 34. In this case, the holder frame 22 is going to be displaced larger than the first length "L6" in the first axial line direction, the first restricted parts 38a and 38b of the protruded part 26 are contacted with the first restriction parts 46a and 46b. As a result, displacement (shake) of the holder frame 22 in the first axial line direction exceeding the first length "L6" in a direction coming close to the first restriction parts 46a and 46b is restricted.

In this embodiment, a pair of the protruded part 26 and the receiving part 34 is further formed between the movable body 14 and the fixed body 16 at a position on an opposite side in the first axial line with the optical axis "L" interposed therebetween. Therefore, two pairs of the protruded parts 26 and the receiving parts 34 are disposed with the optical axis "L" interposed therebetween on the first axial line and thus, displacement of the movable body 14 with respect to the fixed body 16, in other words, in FIG. 6, displacements of the protruded part 26 in both directions of a direction coming close to and a direction separating from the first restriction parts 46a and 46b can be restricted. Accordingly, deformation in the first axial line direction of the elastic member 36 exceeding a predetermined amount can be restrained and thus, unintended deformation can be restrained.

In this embodiment, the distance "L6" between the first restriction parts 46a and 46b and the first restricted parts 38a and 38b, in other words, the first length is set to be a distance smaller than the distance "L5", in other words, the second length between the first portion 36e and the second portion 36f of the elastic member 36. In this case, it is desirable that the distances "L6" between the first restriction parts 46a and 46b and the first restricted parts 38a and 38b are set to be a distance within an elastic deformation region in the first axial line direction of the first portion 36e or the second portion 36f of the elastic member 36.

According to this structure, even in a case that the movable body 14 is displaced in the first axial line direction with respect to the fixed body 16, deformation of the first portion 36e and the second portion 36f of the elastic member 36 can be set within the elastic deformation region and thus, plastic deformation of the first portion 36e and the second portion 36f of the elastic member 36 can be prevented.

In this embodiment, the second restriction parts 48a and 48b are structured as faces extending along the first axial line direction in the receiving part 34. In this embodiment, the second restriction part 48a is provided at a position facing the second restricted part 40a formed in the protruded part 26. Similarly, the second restriction part 48b is provided at a position facing the second restricted part 40b formed in the protruded part 26. In this embodiment, a pair of the second restriction part 48a and the second restricted part 40a and a pair of the second restriction part 48b and the second restricted part 40b are formed with spaces therebetween in the second axial line direction and function as a shake restriction means in a turning direction of the movable body 14.

In this embodiment, a distance between the second restriction part 48a and the second restricted part 40a and a distance between the second restriction part 48b and the second restricted part 40b in the second axial line direction are set to be a length "L7".

In this embodiment, as shown in FIG. 7, when the movable body 14 is going to turn larger than the length "L7" in the direction "R" around the optical axis with respect to the fixed body 16, the second restricted part 40b of the movable body 14 is contacted with the second restriction part 48b of the fixed body 16. As a result, a turning (shake) of the movable body 14 larger than the length "L7" with respect to the fixed body 16 is restricted. Similarly, when the movable body 14 is going to turn larger than the length "L7" with respect to the fixed body 16 in a direction opposite to the direction shown in FIG. 7, the second restricted part 40a of the movable body 14 is contacted with the second restriction part 48a of the fixed body 16 and thereby, a turning (shake) of the movable body 14 is restricted.

In this embodiment, the receiving part 34 is formed with elastic member facing parts 34c and 34d which face the first elastic part 36c of the elastic member 36. Specifically, in the receiving part 34, the elastic member facing part 34c is provided on a side where the second restriction part 48a is provided, and the elastic member facing part 34d is provided on a side where the second restriction part 48b is provided.

In this embodiment, a distance between the first elastic part 36c of the elastic member 36 and the elastic member facing part 34c and a distance between the first elastic part 36c and the elastic member facing part 34d are set to be a length "L8". In this embodiment, the length "L7" of the distance between the second restriction part 48a and the second restricted part 40a and the distance between the second restriction part 48b and the second restricted part 40b is set to be smaller than the length "L8" of the distance between the first elastic part 36c and the elastic member facing part 34c and the distance of the first elastic part 36c and the elastic member facing part 34d.

Therefore, as shown in FIG. 7 and FIG. 8, when the movable body 14 is turned with respect to the fixed body 16 and the first portion 36e and the second portion 36f of the first elastic part 36c of the elastic member 36 are respectively elastically deformed in reverse directions in the direction "R" around the optical axis, the first portion 36e can be prevented from contacting with the elastic member facing part 34d, and the second portion 36f can be prevented from contacting with the elastic member facing part 34c.

In addition, it is desirable that the lengths "L7" of the distance between the second restriction part 48a and the second restricted part 40a and the distance between the second restriction part 48b and the second restricted part 40b are set to be a distance within the elastic deformation region in the second axial line direction of the first portion 36e or the second portion 36f of the elastic member 36. According to this structure, unintended deformation, i.e., plastic deformation of the first elastic part 36c can be prevented.

Next, third restriction parts 50 and 52 will be described below with reference to FIG. 3 and FIG. 9. In this embodiment, an end part of the receiving part 34 on the "+Z" axial direction side is provided with a third restriction part 50. The third restriction part 50 is disposed on the "+Z" direction side with respect to the protruded part 26 with a distance having a length "L9" therebetween and is structured so as to cover the protruded part 26 from the "+Z" direction side. Specifically, the third restriction part 50 faces the third restricted part 42a of the end part on the "+Z" axial direction side of the protruded part 26 with a space having the length "L9". The third restriction part 50 restricts displacement of the movable body 14 to the "+Z" axial direction side when the movable body 14 is going to be displaced larger than the length "L9" to the "+Z" axial direction.

On the other hand, the outer end part 30b of the bottom plate 30 is disposed on the "−Z" direction side with respect to the protruded part 26 with a space having a length "L10" therebetween. A portion of the outer end part 30b which faces the protruded part 26 functions as the third restriction part 52 which restricts displacement to the "−Z" axial direction of the movable body 14. Specifically, the third restriction part 52 faces the third restricted part 42b of an end part on the "−Z" axial direction side of the protruded part 26 with a space having the length "L10". The third restriction part 52 restricts displacement of the movable body 14 to the "−Z" axial direction side when the movable body 14 is going to be displaced larger than the length "L10" in the "−Z" axial direction.

In this embodiment, it is desirable that the length "L9" and the length "L10" are set to be distances within an elastic deformation region in the optical axis direction of the second elastic part 36d of the elastic member 36. According to this structure, unintended deformation, i.e., plastic deformation of the second elastic part 36d can be prevented.

In this embodiment, the movable body 14 and the fixed body 16 are structured so that two pairs of the protruded parts 26 and the receiving parts 34 are provided in the first axial line direction with the optical axis "L" interposed therebetween and that two pairs of the protruded part 26 and the receiving part 34 are provided in the second axial line direction with the optical axis "L" interposed therebetween. In addition, each of the protruded parts 26 is provided with the first restricted part 38, the second restricted part 40 and the third restricted part 42, and each of the receiving parts 34 and the bottom plate 30 are provided with the first restriction part 46, the second restriction part 48 and the third restriction parts 50 and 52. These facing pairs of the restricted parts 38, 40 and 42 and the restriction parts 46, 48, 50 and 52 are respectively structured to restrict displacement (shake) of the movable body 14 with respect to the fixed body 16 in the first axial line direction, the second axial line direction and the optical axis direction.

In addition, the elastic member 36 is attached to the protruded part 26 and the receiving part 34 which are a means for restricting displacement (shake). Therefore, a load applied to the elastic member 36 due to a shake of the movable body 14 can be directly reduced and thus, unintended deformation, in other words, plastic deformation and the like are restrained and optical performance of the optical unit 10 can be maintained. In addition, an attaching portion of the elastic member 36 is structured as a restriction means and thus, a shake of the movable body 14 can be restricted with a high degree of accuracy.

Modified Embodiment of First Embodiment (1) In the embodiment described above, the movable body 14 and the fixed body 16 are structured so that two pairs of the protruded parts 26 and the receiving parts 34 are provided in the first axial line direction with the optical axis "L" interposed therebetween and two pairs of the protruded parts 26 and the receiving parts 34 are provided in the second axial line direction with the optical axis "L" interposed therebetween. However, it may be structured that a pair of the protruded part 26 and the receiving part 34 is provided at rotationally symmetrical positions at equal intervals in the direction "R" around the optical axis. Also in this structure, similar operations and effects to the above-mentioned structure can be obtained. This modified embodiment may be applied to second and subsequent embodiments described below.

Figure 10:
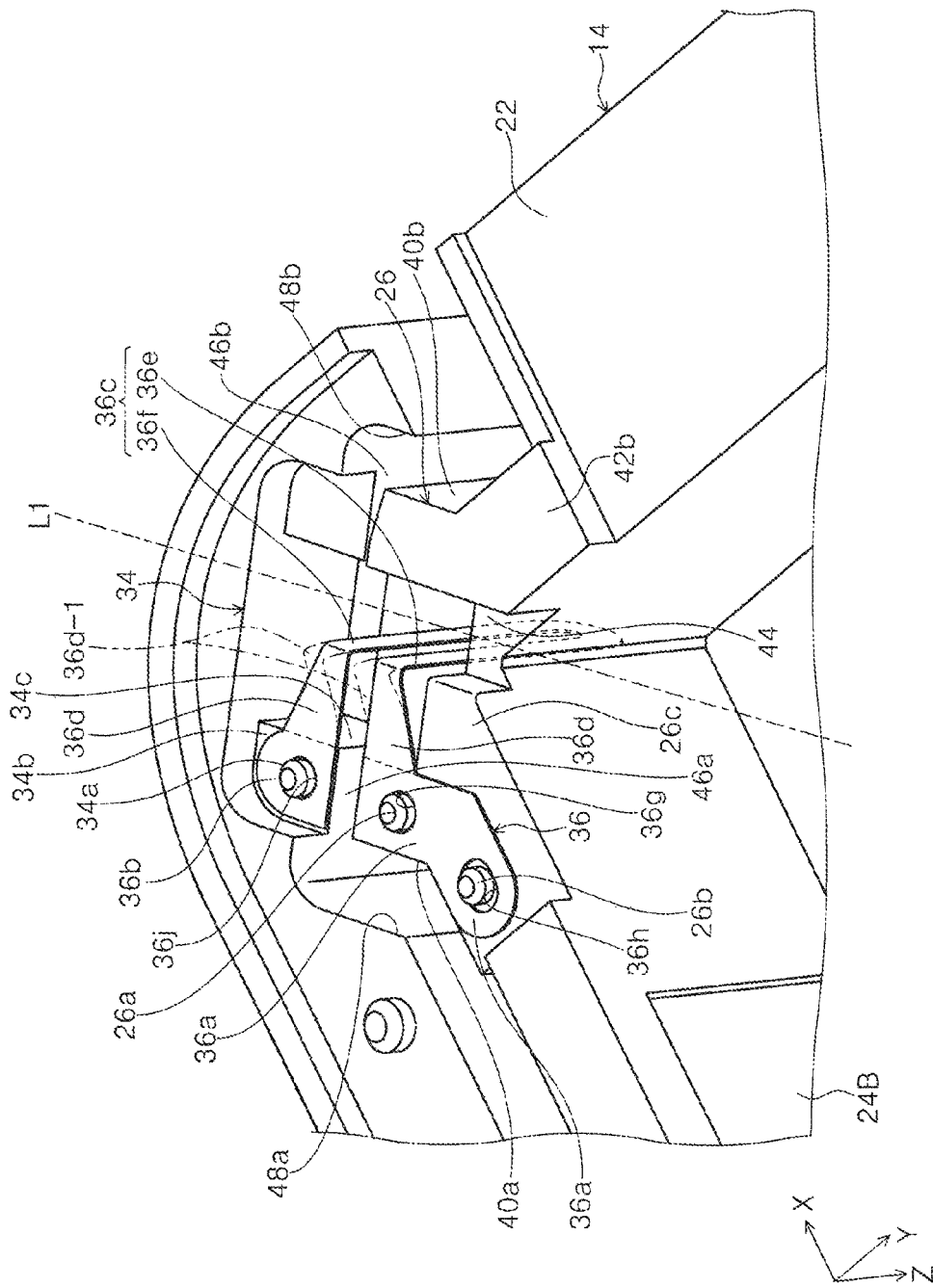
FIG. 10 is a perspective view showing a modified embodiment of an elastic member in accordance with the present invention.

(2) In the embodiment described above, the elastic member 36 is structured so as to provide the second elastic part 36d between the first elastic part 36c and the other end part 36b. However, instead of the structure, it may be structured that the second elastic part 36d is provided between the first elastic part 36c and the one end part 36a and, as shown in FIG. 10, it may be structured that the second elastic parts 36d are respectively provided between the first elastic part 36c and the one end part 36a and between the first elastic part 36c and the other end part 36b. Especially, when the second elastic part 36d is provided at two positions, durability in the optical axis direction of the elastic member 36, in other words, in the optical unit 10 can be improved. As a result, buckling of the second elastic part 36d of the elastic member 36 can be suppressed. In FIG. 10, the two-dot chain line with the reference sign 36d-1 schematically shows the second elastic parts 36d which are elastically deformed in the optical axis direction.

Second Embodiment

A second embodiment of the optical unit 10 will be described below with reference to FIG. 11 and FIG. 12. The second embodiment differs from the first embodiment in a shape of an elastic member 54. Structures other than the elastic member 54 are similar to the first embodiment.

Figure 11:
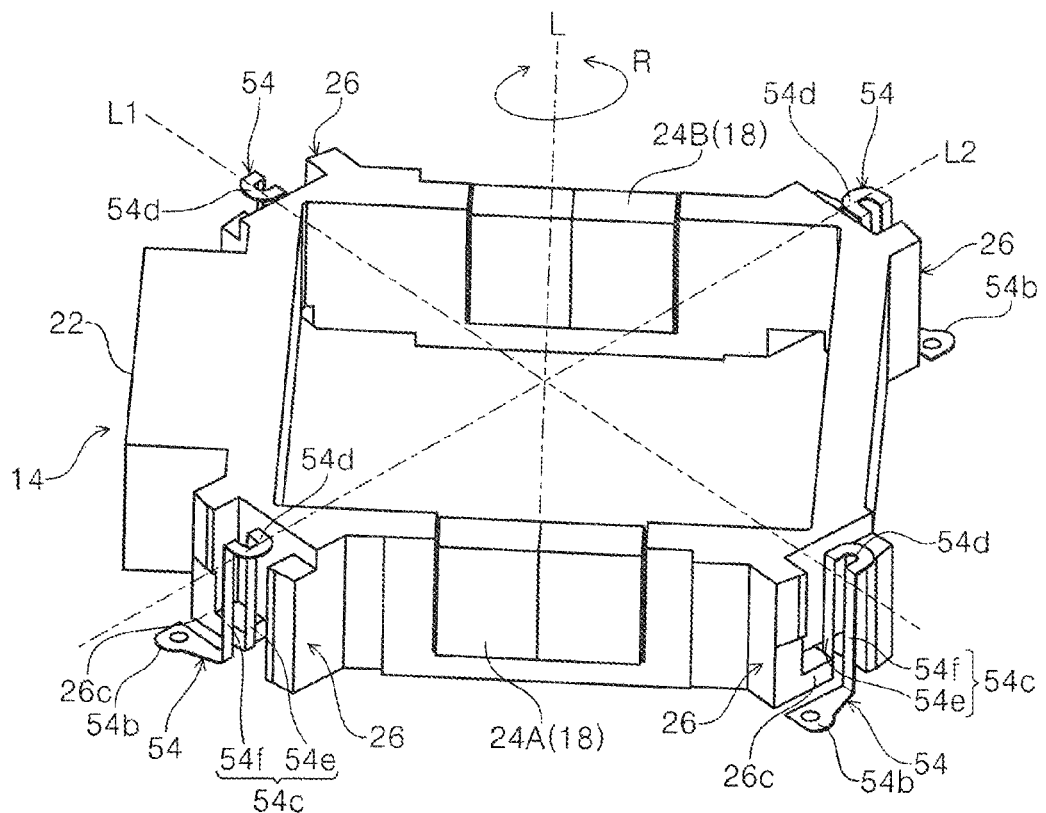
FIG. 11 is a perspective view showing a movable body and a rolling support mechanism in accordance with a second embodiment.

In FIG. 11, also in this embodiment, it is structured that one end part 54a of the elastic member 54 is attached to the protruded part 26 provided in each of the four corners of the holder frame 22 and the other end part 54b is attached to the receiving part 34 of the fixed frame 28 not shown.

Figure 12:
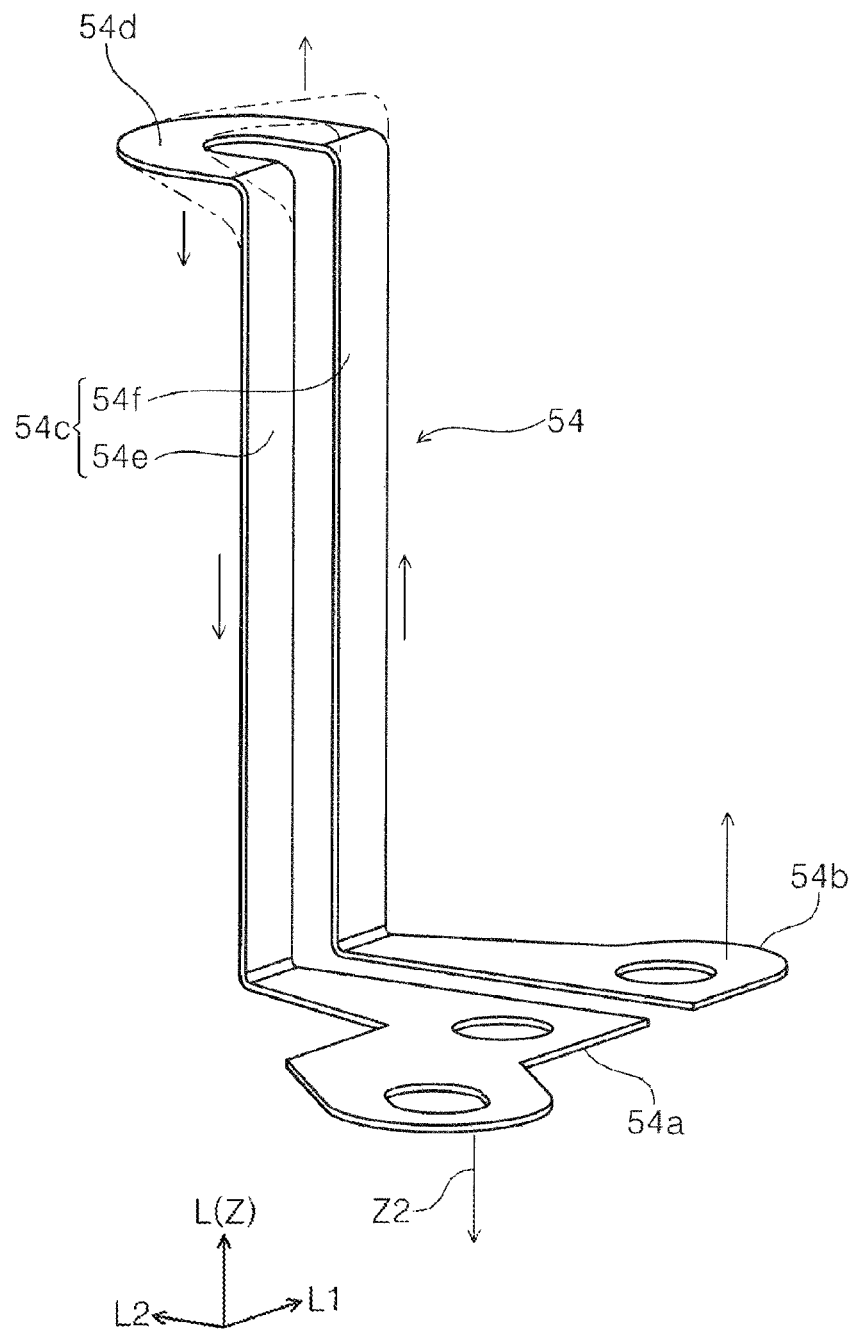
FIG. 12 is a perspective view showing an elastic member in accordance with a second embodiment.

In FIG. 12, the elastic member 54 is provided with one end part 54a, the other end part 54b, a first elastic part 54c and a second elastic part 54d and is formed in a "U"-shape as a whole. The first elastic part 54c is extended along the optical axis direction and is provided with a first portion 54e and a second portion 54f. The first portion 54e and the second portion 54f are, as an example, disposed with a space therebetween in the second axial line direction. A posture of the elastic member 54 in FIG. 12 shows one example, and a direction where the first portion 54e and the second portion 54f are spaced may be the first axial line direction. Further, in FIG. 12, the optical axis direction is set in the "Z"-axis direction.

In this embodiment, the second elastic part 54d is formed between the first portion 54e and the second portion 54f of the first elastic part 54c. The second elastic part 54d is, as an example, extended in the second axial line direction, in other words, in a direction intersecting the optical axis "L". The second elastic part 54d in this embodiment is extended in the second axial line direction from the first portion 54e and then, curved in a "U"-shape and connected with the second portion 54f. In other words, the second elastic part 54d in this embodiment structures a "U"-shaped portion of the elastic member 54.

In the elastic member 54 in this embodiment, when a force in the optical axis direction, for example, a force with the reference sign "Z2" is applied between the one end part 54a and the other end part 54b, the other end part 54b is fixed to the fixed body 16 and thus, the one end part 54a is going to be displaced in a direction that the force "Z2" is applied, i.e., to the "−Z" direction in FIG. 12. Therefore, the first portion 54e and the second portion 54f are going to be displaced in reverse directions in the optical axis direction ("Z"-axis direction). As a result, a portion of the second elastic part 54d connected with the first portion 54e is displaced to the "−Z" axial direction side and a portion connected with the second portion 54f is going to be displaced to the "+Z" direction side.

As a result, a displacement amount of the second elastic part 54d can be made smaller than a displacement amount of the movable body 14 and thus, a load applied to the second elastic part 54d can be reduced. Further, the second elastic part 54d is formed in a "U"-shape and thus, durability of the second elastic part 54*d* can be enhanced and buckling of the second elastic part 54*d* can be suppressed.

Third Embodiment

Figure 13:
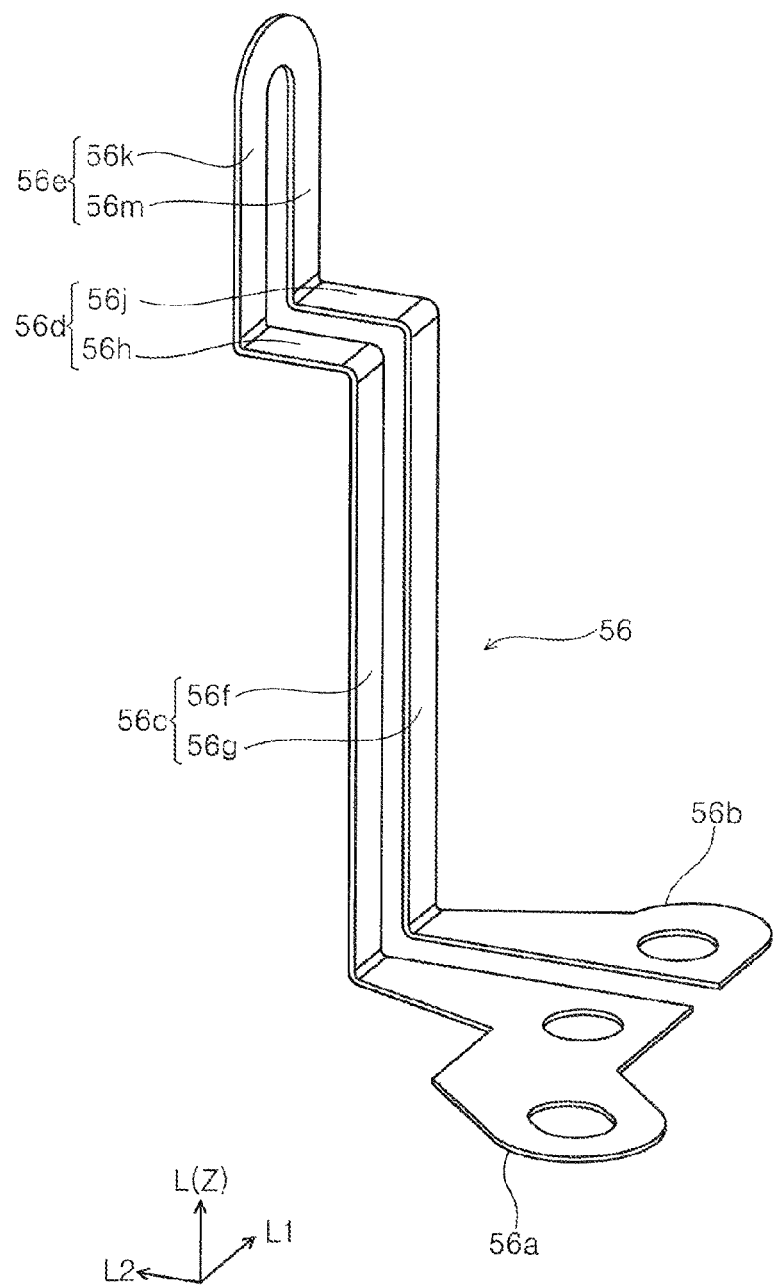
FIG. 13 is a perspective view showing an elastic member in accordance with a third embodiment.

A third embodiment of the optical unit 10 will be described below with reference to FIG. 13. The third embodiment differs from the first embodiment and the second embodiment in a shape of an elastic member 56. Structures other than the elastic member 56 are similar to the first embodiment.

The elastic member 56 is provided with one end part 56*a*, the other end part 56*b*, a first elastic part 56*c*, a second elastic part 56*d* and a third elastic part 56*e*, and is formed in a "U"-shape as a whole. The first elastic part 56*c* is extended along the optical axis direction and is provided with a first portion 56*f* and a second portion 56*g*. The second elastic part 56*d* is extended along a direction intersecting the optical axis, i.e., along the second axial line direction in FIG. 13, and is provided with a first portion 56*h* and a second portion 56*j*. The third elastic part 56*e* is extended along the optical axis direction and is provided with a first portion 56*k* and a second portion 56*m*.

In this embodiment, the elastic member 56 is provided, in order from one end part 56*a*, with the first portion 56*f*, the first portion 56*h* and the first portion 56*k*, and is provided, in order from the other end part 56*b*, with the second portion 56*g*, the second portion 56*j* and the second portion 56*m*. The third elastic part 56*e* is formed in a "U"-shape. In this embodiment, the first portions 56*f*, 56*h* and 56*k* and the second portions 56*g*, 56*j* and 56*m* are, as an example, disposed with a space therebetween in the second axial line direction. A posture of the elastic member 56 in FIG. 13 shows one example, and a direction where the first portions 56*f*, 56*h* and 56*k* and the second portions 56*g*, 56*j* and 56*m* are spaced may be the first axial line direction. Further, in FIG. 13, the optical axis direction is set in the "Z"-axis direction.

In this embodiment, two portions, specifically, the first elastic part 56*c* and the third elastic part 56*e* are provided which generate elastic forces in the direction "R" around the optical axis. Further, the second elastic part 56*d* is provided as a portion which generates an elastic force in the optical axis direction. In this embodiment, two portions are provided which generate elastic forces in the direction "R" around the optical axis and thus, a shake in the direction "R" around the optical axis can be surely restricted. In addition, the second elastic part 56*d* is provided with the first portion 56*h* and the second portion 56*j* and thus, durability of the second elastic part 56*d* can be enhanced and buckling of the second elastic part 56*d* can be suppressed.

Fourth Embodiment

Figure 14:
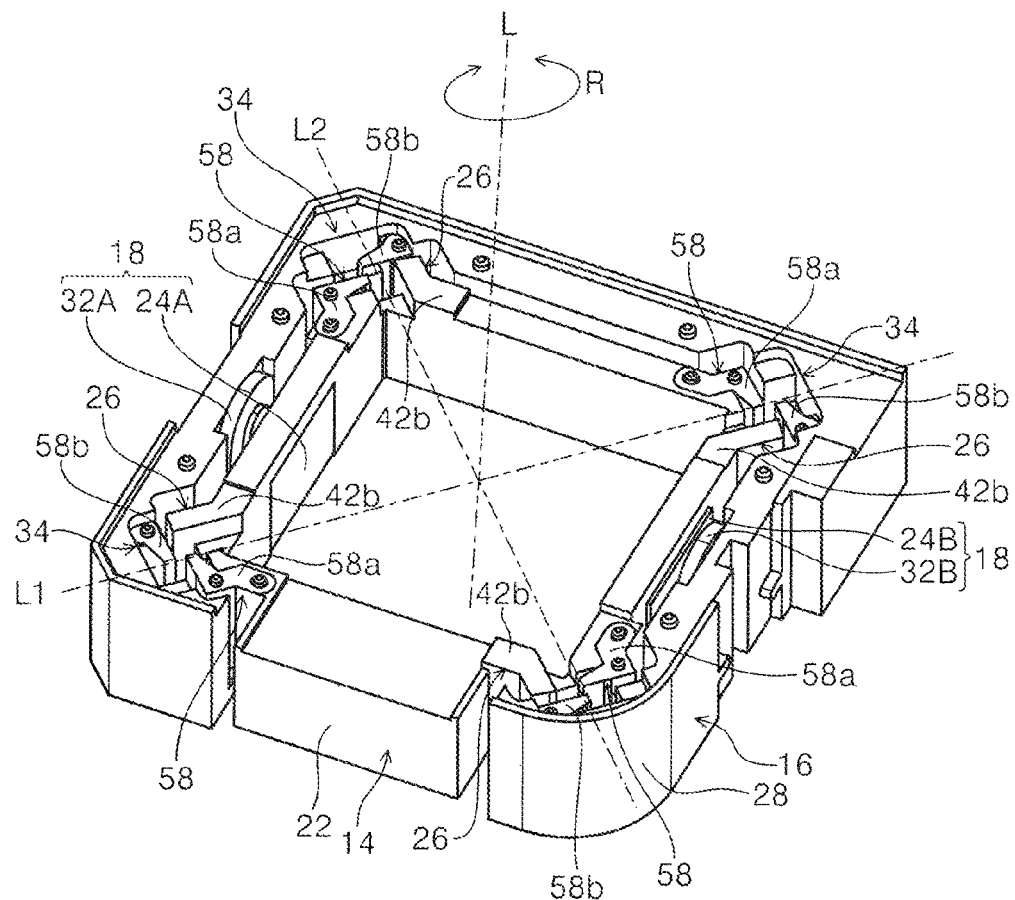
FIG. 14 is a perspective view showing a relationship between a movable body and a fixed body in an optical unit in accordance with a fourth embodiment.

A fourth embodiment of the optical unit 10 will be described below with reference to FIG. 14 and FIG. 15. The fourth embodiment differs from the first embodiment through the third embodiment in a shape of an elastic member 58. Structures other than the elastic member 58 are similar to the first embodiment.

Figure 15:
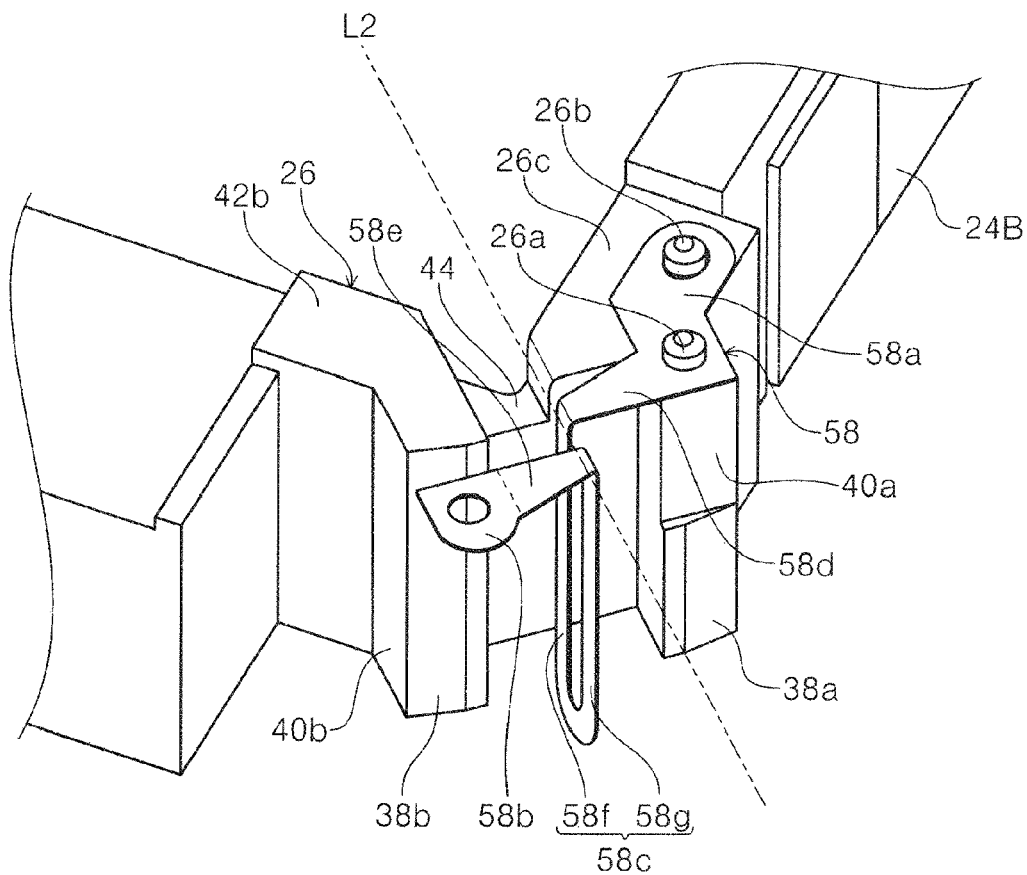
FIG. 15 is a perspective view showing a rolling support mechanism in accordance with a fourth embodiment.

In FIG. 15, also in this embodiment, it is structured that one end part 58*a* of the elastic member 58 is attached to the protruded part 26 provided in four corners of the holder frame 22 and the other end part 58*b* is attached to the receiving part 34 of the fixed frame 28 not shown.

In FIG. 15, the elastic member 58 is provided with the one end part 58*a*, the other end part 58*b*, a first elastic part 58*c* and second elastic parts 58*d* and 58*e*. The first elastic part 58*c* is extended along the optical axis direction and is provided with a first portion 58*f* and a second portion 58*g*. The first portion 58*f* and the second portion 58*g* are, as an example, disposed with a space therebetween in the second axial line direction. In this embodiment, the first elastic part 58*c* is formed in a "U"-shape. A posture of the elastic member 58 in FIG. 15 shows one example, and a direction where the first portion 58*f* and the second portion 58*g* are spaced may be the first axial line direction. Further, in FIG. 15, the optical axis direction is set in the "Z"-axis direction.

In this embodiment, the second elastic part 58*d* is formed between the one end part 58*a* and the first portion 58*f* of the first elastic part 58*c*, and the second elastic part 58*e* is formed between the other end part 58*b* and the second portion 58*g* of the first elastic part 58*c*. Further, in the elastic member 58 in this embodiment, the one end part 58*a* is formed on one side with respect to the second axial line and the other end part 58*b* is formed on the other side with respect to the second axial line.

Also in this embodiment, two second elastic parts 58*d* and 58*e* are formed in the elastic member 58 and thus, durability in the optical axis direction of the elastic member 58 can be enhanced and buckling of the second elastic parts 58*d* and 58*e* can be suppressed.

Fifth Embodiment

Figure 16A:
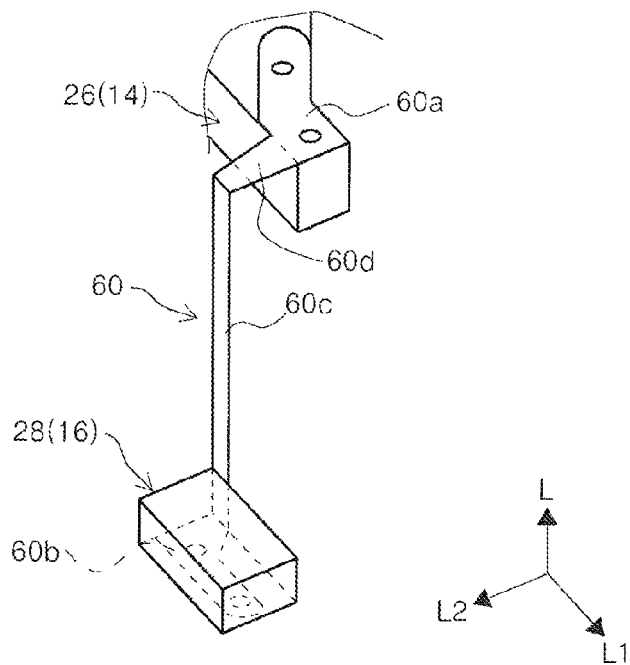
In FIG. 16A is a perspective view showing an elastic member in accordance with a fifth embodiment.
Figure 16B:
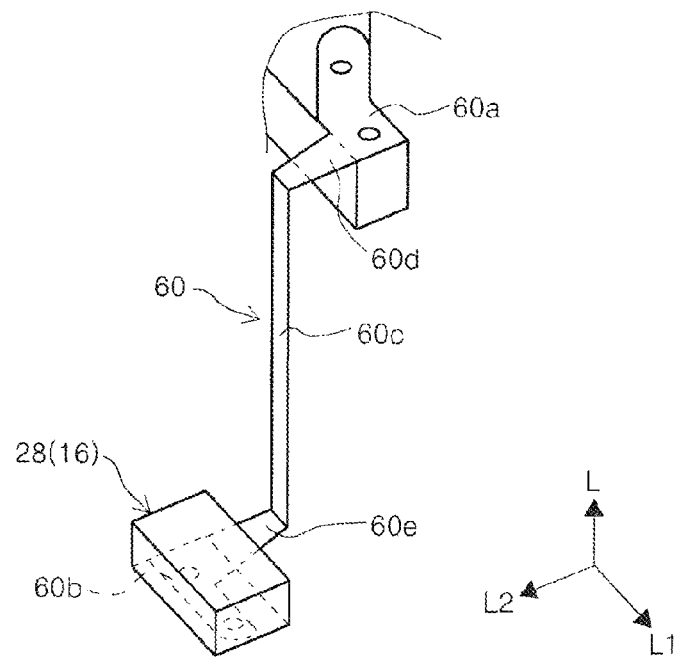
FIG. 16B is a perspective view showing an elastic member in accordance with a modified embodiment of the fifth embodiment.

A fifth embodiment will be described below with reference to FIG. 16A. In FIG. 16A and FIG. 16B, also in this embodiment, it is structured that one end part 60*a* of an elastic member 60 is attached to the protruded part 26 provided in four corners of the holder frame 22 and the other end part 60*b* is attached to the receiving part 34 of the fixed frame 28 not shown.

In FIG. 16A, the elastic member 60 is formed in an "I"-shape as a whole and is provided with one end part 60*a*, the other end part 60*b*, a first elastic part 60*c* and a second elastic part 60*d*. In this embodiment, one end of the second elastic part 60*d* is connected with the one end part 60*a* and the second elastic part 60*d* is extended in a direction intersecting the optical axis. The other end of the second elastic part 60*d* is connected with the first elastic part 60*c*. The first elastic part 60*c* is extended along the optical axis direction and its end part on the "−Z" direction side is connected with the other end part 60*b*.

In this embodiment, the one end part 60*a* and the other end part 60*b* of the elastic member 60 are, as an example, disposed on opposite sides to each other in the second axial line direction. Also in this embodiment, the elastic member 60 is provided with the first elastic part 60*c* which generates an elastic force in the direction "R" around the optical axis and the second elastic part 60*d* which generates an elastic force in the optical axis direction and thus, a structure of the shake restriction means in the optical unit 10 can be simplified. Further, in the elastic member 60, the first elastic part 60*c* is formed in an "I"-shape and thus, an occupation area of the elastic member 60 in the optical unit 10 can be reduced in a radial direction with the optical axis "L" as a center, and a size of the device can be reduced.

Modified Embodiment of Fifth Embodiment

In the embodiment described above, as shown in FIG. 16A, the second elastic part 60*d* is structured to dispose between the one end part 60*a* and the first elastic part 60*c*. However, instead of this structure, the second elastic part 60*d* may be structured to dispose between the other end part 60*b* and the first elastic part 60*c*. Further, as shown in FIG. 16B, it may be structured that two second elastic parts are provided by disposing the second elastic part 60*d* between the one end part 60*a* and the first elastic part 60*c* and by disposing a second elastic part 60*e* between the other end part 60*b* and the first elastic part 60*c*.

While the description above refers to particular embodiments of the present invention, it will be understood that many modifications may be made without departing from the spirit thereof. The accompanying claims are intended to cover such modifications as would fall within the true scope and spirit of the present invention.

The invention claimed is:

1. An optical unit comprising:
a movable body comprising an optical module;
a fixed body;
a rolling support mechanism which turnably supports the movable body around an optical axis of the optical module with respect to the fixed body; and
a rolling drive mechanism structured to turn the movable body around the optical axis;
wherein the rolling support mechanism comprises elastic members which are disposed at a plurality of positions around the optical axis between the movable body and the fixed body, the movable body being turnably supported around the optical axis by the elastic members;
wherein the elastic member comprises:
one end part which is connected with the movable body;
an other end part which is connected with the fixed body; and
a first elastic part and a second elastic part which are disposed between the one end part and the other end part;
wherein the first elastic part is extended along a direction of the optical axis so as to generate an elastic force in a direction around the optical axis, and
the second elastic part is extended from the first elastic part in a direction intersecting the optical axis so as to generate an elastic force in the direction of the optical axis.

2. The optical unit according to claim 1, wherein
the elastic member is structured as a plate spring,
a length of the first elastic part in the direction of the optical axis is larger than a plate thickness in the direction of the optical axis of the second elastic part, and
a length of the second elastic part in the direction intersecting the optical axis is larger than a plate thickness of the first elastic part in the direction intersecting the optical axis.

3. The optical unit according to claim 2, wherein
the first elastic part of the elastic member is formed in a "U"-shape,
one end of the first elastic part is connected with one of the one end part and the other end part, and
an other end of the first elastic part is connected with an other of the one end part and the other end part through the second elastic part.

4. The optical unit according to claim 3, wherein
the second elastic part is formed in a taper shape whose plate width becomes wide as going from the first elastic part toward the one end part or the other end part.

5. The optical unit according to claim 2, wherein
the first elastic part of the elastic member is formed in a "U"-shape,
the second elastic part is disposed at each of both ends of the first elastic part, and
the first elastic part is connected with the one end part and the other end part through the second elastic parts.

6. The optical unit according to claim 5, wherein
the one end part is extended to a first direction in the direction around the optical axis, and
the other end part is extended to a second direction opposite to the first direction in the direction around the optical axis.

7. The optical unit according to claim 2, wherein
the second elastic part of the elastic member is formed in a "U"-shape, and
the first elastic part comprises:
a first portion which is located between one end of the second elastic part and the one end part; and
a second portion which is located between an other end of the second elastic part and the other end part.

8. The optical unit according to claim 2, wherein
the first elastic part of the elastic member is formed in an "I"-shape, and
the second elastic part is disposed at least one of a position between the one end part and the first elastic part and a position between the other end part and the first elastic part.

9. The optical unit according to claim 2, wherein
the rolling support mechanism comprises at least one protruded part which is protruded from one of the movable body and the fixed body toward an other of the movable body and the fixed body,
the protruded part is fixed with one of the one end part and the other end part of the elastic member, and
the protruded part is structured to restrict a shake of the movable body by contacting with the other of the movable body and the fixed body.

10. The optical unit according to claim 9, wherein
the rolling support mechanism comprises a receiving part which receives the protruded part in the other of the movable body and the fixed body,
a space having a first length is formed between the protruded part and the receiving part in a first axial line direction intersecting the optical axis and passing the protruded part and the receiving part,
the elastic member is disposed so that a plate thickness direction of the first elastic part is set in a direction intersecting the first axial line direction,
the first elastic part comprises a first portion and a second portion which are extended along the direction of the optical axis,
the first portion and the second portion are disposed with a space having a second length therebetween in the first axial line direction, and
the first length is shorter than the second length.

11. The optical unit according to claim 10, wherein
the protruded part is provided in the movable body, and
a portion of the protruded part facing the receiving part in the first axial line direction is formed in a circular arc shape with the optical axis as a center.

12. The optical unit according to claim 10, wherein
at least one of the protruded part and the receiving part comprises a positioning part which positions at least one of the one end part and the other end part of the elastic member.

13. The optical unit according to claim 12, wherein
the positioning part is a protruded part which is formed in at least one of the protruded part and the receiving part, and at least one of the one end part and the other end part of the elastic member is formed with a recessed part or a hole which is fitted with the protruded part.

14. The optical unit according to claim 12, wherein
at least one of the protruded part and the receiving part comprises a turning restriction part which restricts turning of the elastic member.

15. The optical unit according to claim 1, wherein
the optical module comprises a shake correction mechanism in a pitching direction and a yawing direction.

* * * * *